US012436317B2

(12) United States Patent
Bifano et al.

(10) Patent No.: US 12,436,317 B2
(45) Date of Patent: Oct. 7, 2025

(54) HIGH THROUGHPUT SCREENING SYSTEM FOR ENGINEERED CARDIAC TISSUES

(71) Applicants: Trustees of Boston University, Boston, MA (US); Massachusetts Institute of Technology, Cambridge, MA (US)

(72) Inventors: Thomas Bifano, Mansfield, MA (US); Jerome Mertz, Newton, MA (US); Marshall Ma, Watertown, MA (US); Devin Beaulieu, Brookline, MA (US)

(73) Assignees: Trustees of Boston University, Boston, MA (US); Massachusetts Institute of Technology, Cambridge, MA (US)

( * ) Notice: Subject to any disclaimer, the term of this patent is extended or adjusted under 35 U.S.C. 154(b) by 47 days.

(21) Appl. No.: 18/223,289

(22) Filed: Jul. 18, 2023

(65) Prior Publication Data

US 2024/0027655 A1 Jan. 25, 2024

Related U.S. Application Data

(60) Provisional application No. 63/390,469, filed on Jul. 19, 2022.

(51) Int. Cl.
*G02B 21/00* (2006.01)
*G02B 3/00* (2006.01)
(Continued)

(52) U.S. Cl.
CPC ............ *G02B 3/0037* (2013.01); *G02B 13/22* (2013.01); *G02B 19/0047* (2013.01); *G02B 21/0076* (2013.01); *G02B 21/06* (2013.01)

(58) Field of Classification Search
CPC ................ G02B 21/00; G02B 21/0004; G02B 21/0016; G02B 21/0028; G02B 21/0032;
(Continued)

(56) References Cited

U.S. PATENT DOCUMENTS 6,411,835 B1 * 6/2002 Modell ................ A61B 5/0075
600/407
6,686,582 B1 * 2/2004 Volcker .............. G01N 21/6452
250/461.2
(Continued)

FOREIGN PATENT DOCUMENTS

EP 1511990 B1 3/2015

OTHER PUBLICATIONS

Da Rocha et al., "hiPSC-CM Monolayer Maturation State Determines Drug Responsiveness in High Throughput Pro-Arrhythmia Screen," Scientific Reports, vol. 7, No. 13834, pp. 1-12, 2017.
(Continued)

*Primary Examiner* — Thong Q Nguyen
(74) *Attorney, Agent, or Firm* — Cesari and McKenna, LLP; Steven M. Mills

(57) ABSTRACT

An exemplary imaging system is provided. The imaging system includes a light source configured to illuminate a plurality of spatially separated regions of a material structure producing a first illumination. A lens produces an image of the spatially separated regions. A lens array magnifies the spatially separated regions of the image. The lens array produces a mosaic image comprised of magnified subimages of each region spatially separated region. A camera sensor to record the image.

21 Claims, 19 Drawing Sheets

(51) Int. Cl.
  *G02B 13/22* (2006.01)
  *G02B 21/06* (2006.01)
  *G02B 19/00* (2006.01)
(58) Field of Classification Search
  CPC .............. G02B 21/004; G02B 21/0052; G02B 21/006; G02B 21/0076; G02B 21/008; G02B 21/06; G02B 21/08; G02B 21/18; G02B 3/0037
  USPC .................................................. 359/368–398
  See application file for complete search history.

(56) References Cited

U.S. PATENT DOCUMENTS

| | | | |
|---|---|---|---|
| 7,723,662 B2 * | 5/2010 | Levoy ................ | G02B 27/0075 359/368 |
| 9,285,318 B2 * | 3/2016 | Boege ....................... | G01J 3/10 |
| 2021/0263010 A1 | 8/2021 | Li et al. | |

OTHER PUBLICATIONS

Gintant et al., "Repolarization studies using human stem cell-derived cardiomyocytes: Validation studies and best practice recommendations," Regulatory Toxicology and Pharmacology, vol. 117, pp. 1-15, 2020.

Gintant et al., "Use of Human Induced Pluripotent StemCell-Derived Cardiomyocytes in Preclinical Cancer Drug Cardiotoxicity Testing," Circulation Research, pp. e75-e92, 2019.

Go et al., "Heart Disease and Stroke Statistics—2014 Update A Report From the American Heart Association," Circulation, vol. 129, No. 3, pp. e28-e292, 2014.

Gracioso Martins et al., "Microphysiological System for High-Throughput Computer Vision Measurement of Microtissue Contraction," ACS Sensors, vol. 6, pp. 985-994, 2021.

Greenberg et al., "Genetic and Tissue Engineering Approaches to Modeling the Mechanics of Human Heart Failure for Drug Discovery," Frontiers in Cardiovascular Medicine, vol. 5, Art. 120, pp. 1-12, 2018.

Hansen et al., "Development of a Drug Screening Platform Based on Engineered Heart Tissue," Circulation Research, pp. 35-44, 2010.

Helmy et al., "Resuscitating Cardiovascular Drug Development," JAMA Cardiology, vol. 2, No. 12, pp. 1295-1296, 2017.

Herron et al., "Extracellular Matrix-Mediated Maturation of Human Pluripotent Stem Cell-Derived Cardiac Monolayer Structure and Electrophysiological Function," Circulation: Arrhythmia and Electrophysiology, pp. 1-12, 2016.

Kurokawa et al., "Tissue engineering the cardiac microenvironment: Multicellular microphysiological systems for drug screening," Advanced Drug Delivery Reviews 96, pp. 225-233, 2016.

Laverty et al., "How can we improve our understanding of cardiovascular safety liabilities to develop safer medicines?" British Journal of Pharmacology, vol. 163, pp. 675-693, 2011.

Legant et al., "Microfabricated tissue gauges to measure and manipulate forces from 3D microtissues," PNAS, vol. 106, No. 25, pp. 10097-100102, 2009.

Li et al., "Cardiotoxicity screening: a review of rapid-throughput in vitro approaches," Archives of Toxicology, vol. 90, pp. 1803-1816, 2016.

Mann et al., "The Rising Cost of Developing Cardiovascular Therapies and Reproducibility in Translational Research: Do Not Blame It (All) on the Bench," JACC: Basic Translational Science, vol. 2, No. 5, pp. 627-629, 2017.

Mannhardt et al., "Automated Contraction Analysis of Human Engineered Heart Tissue for Cardiac Drug Safety Screening," Journal of Visualized Experiments, vol. 122, pp. 1-10, 2017.

Moore et al., "Estimated Costs of Pivotal Trials for Novel Therapeutic Agents Approved by the US Food and Drug Administration, 2015-2016" JAMA Internal Medicine, vol. 178, No. 11, pp. 1451-1457, 2018.

Polacheck et al., "Measuring cell-generated forces: a guide to the available tools," Nature Methods, vol. 13, No. 5, pp. 415-423, 2016.

Portillo-Lara et al., "Biomimetic cardiovascular platforms for in vitro disease modeling and therapeutic validation," Biomaterials, vol. 198, pp. 78-94, 2019.

Ribeiro et al., "Functional maturation of human pluripotent stem cell derived cardiomyocytes in vitro—Correlation between contraction force and electrophysiology," Biomaterials, vol. 51, pp. 138-150, 2015.

Ronaldson-Bouchard et al., "Advanced maturation of human cardiac tissue grown from pluripotent stem cells," Nature, vol. 556, No. 7700, pp. 239-243, 2018.

Savoji et al., "Cardiovascular disease models: A game changing paradigm in drug discovery and screening," Biomaterials, vol. 198, pp. 3-26, 2019.

Sharma et al., "Use of human induced pluripotent stemcell-derived cardiomyocytes to assess drug cardiotoxicity," Nature Protocols, vol. 13, pp. 3018-3041, 2018.

Van Spreeuwel et al., "The influence of matrix (an)isotropy on cardiomyocyte contraction in engineered cardiac microtissues," Integr. Biol., vol. 6, pp. 422-429, 2014.

Yang et al., "Engineering Adolescence: Maturation of Human Pluripotent Stem Cell-Derived Cardiomyocytes," Circulation Research, pp. 511-523, 2014.

Ma et al., "High throughput screening system for engineered cardiac tissues," Frontiers in Bioengineering and Biotechnology, pp. 1-11, 2023.

International Search Report and Written Opinion of International Application No. PCT/2023/028014, mailed on Oct. 4, 2023.

* cited by examiner

HIGH THROUGHPUT SCREENING SYSTEM FOR ENGINEERED CARDIAC TISSUES

RELATED APPLICATIONS

This application claims priority to U.S. provisional application No. 63/390,469 filed on Jul. 19, 2022, the entire contents of which are incorporated herein by reference.

GOVERNMENT LICENSE RIGHTS

This invention was made with government support under Contract No. EEC1647837 awarded by the National Science Foundation. The government has certain rights in the invention.

BACKGROUND

During late-stage drug development, cardiovascular toxicity is the leading cause and most severe form of adverse drug reactions (ADRs) that contribute to nearly one-thirds of drug attritions, including post-approval withdrawals. Cardiotoxicity screening requires large testing populations and long-term chronic monitoring: under the current paradigm, a single compound may take approximately 12 years and US $2 billion to be declared fully safe for clinical. There is a strong need for high throughput assays based on engineered tissue models with reliable predictivity. Over the past decades, engineered cardiac tissues (ECTs) made with human induced pluripotent stem cell derived cardiomyocytes (hiPSC-CMs) have become powerful model systems with proven physiological similarity. However, functional characterization of the ECTs is still low throughput, preventing ECTs from being used in standard cardiotoxicity screening.

There is an emerging consensus in the field that 3D ECTs provide better predictivity for cardiotoxicity screening as compared to rodent models because they more closely approximate human cardiac tissues and because they allow easier measurements of cardiac function including contractility. Previous studies focused on accelerating electrophysiological measurements, such as the action potential of the cardiomyocytes and the Ca2+ transient for ECTs in the 2D format. But the scale and throughput of these 2D assays cannot be transferred to 3D ECT-based assays due to the complexity of scaffold fabrication and optical imaging.

A commonly used architecture for 3D ECTs is comprised of 1-2 mm long bundles of cohesive tissue suspended between two compliant polydimethylsiloxane (PDMS) micro-pillars. These structures, namely, micro tissue gauges (µTUGs), were inspired by early models built with embryonic cardiomyocytes. With a uniaxial bending model for the pair of upright micropillars, contractile force in a µTUG can be determined by microscopic imaging of pillar deflection, then relating this deflection to force through a known pillar stiffness and an assumption of linear elasticity for the pillar. Lateral deflections at the top of each pillar in response to contractile ECT twitches range from a few micrometers to a few tens of micrometers. To date, most ECT contractility measurement systems that use optical imaging to infer twitch force are limited in throughput: they can only measure a small number of ECTs simultaneously.

To monitor ECT contractility in an industry standard 96 well-plate format, for example, one must currently rely on sequential imaging using robotic stage control. While some studies have demonstrated progress toward higher throughput assays, a bottleneck has been the field of view (FOV), and most previous efforts have relied on low throughput serial imaging of individual wells or small groups of wells.

The main engineering challenge in high-throughput contractile force monitoring of ECTs is that the fundamental optical measurement technique used to assess that force is constrained by an inherent optical tradeoff among three characteristics of the optical system: imaging resolution, imaging field of view (FOV), and imaging speed or frame rate. To adapt conventional ECT contractile force monitoring to the industry-standard 96 well-plate format would require an imaging system with ~10 µm resolution, 120 mm field of view, and 60 Hz imaging frame rate.

SUMMARY

According to one aspect of the subject matter described in this disclosure, an exemplary imaging system is provided. The imaging system includes a light source configured to illuminate a plurality of spatially separated regions of a material structure producing a first illumination. A lens produces an image of the spatially separated regions. A lens array magnifies the spatially separated regions of the image. The lens array produces a mosaic image comprised of magnified subimages of each region spatially separated region. A camera sensor to record the image.

In some implementations, the light source may include a white light emitting diode panel. The light source may include a laser or LED illumination intended to excite fluorescence in the spatially separated subregions, and an optical filter is positioned in front of the camera to reject excitation light but pass fluorescently emitted light from the subregions. The material structure may include engineered cardio tissue. The material structure may include biological samples. Each lens of the lens array may be concentrically aligned with each of the plurality of surfaces. Each of the lens may include a doublet lens. The lens is a telecentric lens. The lens array may be positioned before the lens. The lens array may be positioned after the lens.

According to another aspect of the subject matter described in this disclosure, an exemplary method for imaging an object is provided. The method includes the following: providing a light source configured to illuminate a plurality of spatially separated regions of a material structure producing a first illumination; providing a lens for producing an image of the spatially separated regions; magnifying, using a lens array, the spatially separated regions of the image, the lens array producing a mosaic image comprised of magnified subimages of each region spatially separated region; providing a camera sensor to record the image.

In some implementations, the light source may include a white light emitting diode panel. The light source may include a laser or LED illumination intended to excite fluorescence in the spatially separated subregions, and an optical filter is positioned in front of the camera to reject excitation light but pass fluorescently emitted light from the subregions. The material structure may include engineered cardio tissue. The material structure may include biological samples. Each lens of the lens array may be concentrically aligned with each of the plurality of surfaces. Each of the lens may include a doublet lens. The lens is a telecentric lens. The method may further include positioning the lens array before the lens. The method may further include positioning the lens after the lens.

According to another aspect of the subject matter described in this disclosure, an exemplary imaging system is provided. The imaging system includes the following: a light source configured to illuminate a plurality of spatially separated regions of a material structure producing a first illumination; a lens for producing an image of the spatially separated regions; a lens array for magnifying the spatially separated regions of that image, the lens array producing a mosaic image comprised of magnified subimages of each region spatially separated region; and a camera sensor to record the image, wherein the image identifies a property of the material structure.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular exemplary embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

An imaging system and methods for imaging a 96 well-plate allowing for 3D ECT scaffolding, culture, and evaluation in the standard 96 well-plate format. The imaging system provides adequate resolving power over the FOV of a 96 well-plate; have enough processing bandwidth to sense compound-induced responses from 96 ECTs; be able to continuously monitor contractile force over long period of ECT culture.

Figure 1A:
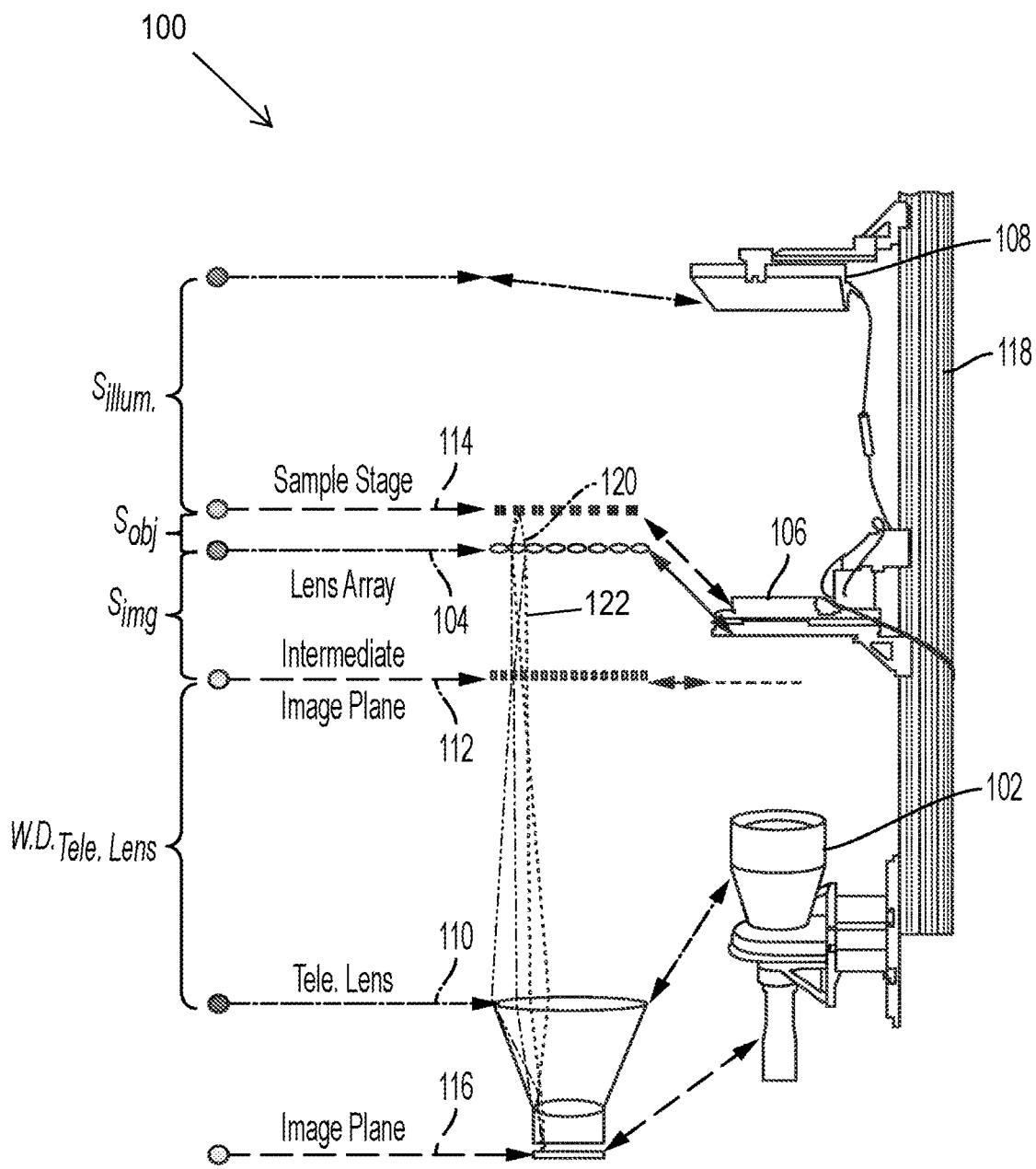
FIGS. 1A-1B are schematic diagrams of exemplary mosaic imaging systems.

FIG. 1A is a schematic diagram of an exemplary mosaic imaging system 100. Imaging system 100 includes a telecentric imaging system 102, lens array 104, well-plate 106, and illumination source 108. The arrangement of mosaic imaging system 100 was inspired by the observation that a conventional image of the entire field of view of a 96 well-plate contains useful information only in a small subset of the imaged pixels. Since area of each well is 81 $mm^2$ and the area occupied by an individual µTug is ~9 $mm^2$, in a conventional image almost 90% of the pixels are not used for the contractility measurement. By inserting a lens array 104 between the well-plate 106 and a conventional telecentric imaging system, the regions of interest are magnified, producing a mosaic image on the camera in which most pixels were associated with the µTug. This efficient increase in resolution without compromising field of view allowed us to achieve full 96 well imaging at the required frame rate, field of view, and resolution using off-the-shelf commercial hardware.

To meet the required temporal resolution of sensing ECT contraction, telecentric imaging system 102 may include a standard CMOS sensor with gigabit ethernet connection was selected to allow image acquisition and data transfer at 60 Hz on a pitch of 4096×3000 pixels (3.45 µm/pixel). A bi-telecentric lens 110 was used to project the 80 mm×120 mm FOV for a 96 well-plate to the camera sensor. The ROI within each well was then individually magnified by 96 achromatic doublet lenses (AC080-016-D8-UC-SP, FL=26 mm, Ø=8.4 mm, Thorlabs) held in lens array 104. The layout of lens array 104 matched the layout of standard 96 well-plate 106 (9 mm pitch between neighboring well): each lens was concentrically aligned with center of each well on the 96 well-plate.

All optical components were vertically placed for the ease of loading and unloading ECT samples to the sample stage 114. To allow easy adjustment of their location, optics were attached to an optical rail 118. Lens array 104 was inserted between the object plane (sample stage) and the telecentric lens 110, at a location where the resultant intermediate image plane 112 is a working distance (W.D.$_{Tele\ Lens}$) (300 mm) away from the telecentric lens 110. Given the focal length of the lens array ($f_{la}$=26 mm), the position of the lens array ($S_{img}$) and the position ($S_{obj}$) of the sample stage 114 for any desired lens array magnification ($M_{la}$) are governed by the following equations:

$$\frac{1}{S_{obj}} + \frac{1}{S_{img}} = \frac{1}{f_{la}} \quad (1)$$

$$\frac{S_{img}}{S_{obj}} = M_{la} \quad (2)$$

By changing the axial placement of the lens array, one may be able to vary the magnification of the mosaic image over a practical range from 3× to 6×. Note telecentric lens 110 has an image plane 116 to direct light to produce the magnified mosaic image captured by a camera, such as a CMOS sensor the like.

Illumination source 108 may be a white light emitting diode (LED) panel wide-field, diffused illumination to the optics, with nominal output of 225 W/m². In other implementations, illumination source 108 may include a laser or LED illumination intended to excite fluorescence with an optical filter positioned in front of the camera of telecentric imaging system 102 to reject excitation light but pass fluorescently emitted light from each of the µTugs of well-plate 106. Moreover, illumination source 108 is separated by a distance (Swum) from sample stage 114. A stage-top incubator was installed at the sample stage 114 to maintain the physiological environment for the ECT (37±0.5° C. temperature, 95%±1% $CO_2$ concentration and ≥80% humidity.

As shown in FIG. 1A, illumination source 108 is configured to illuminate the surfaces of the ECTs in each an individual µTug of well-plate 106 producing a first illumination 120. Lens array 104 magnifies a region of the surfaces of the ECTs by receiving the first illumination 120 and producing a second illumination 122 focused on the magnified region. Telecentric lens 110 produces an image of the magnified region by receiving the second illumination 122 and sending the second illumination to a camera sensor to produce the image.

Telecentric lens 110 may be any kind of lens structure that collects light to create an image at image plane 116. In some instances, telecentric lens 110, as seen in FIG. 1, can be placed nearer or further away from lens array 104, depending on the distortions produced by the environment or the quality of the illumination from illumination source 108 to provide a high-quality image. Optical rail 118 can be utilized to adjust the position of telecentric imaging system 102, which includes telecentric lens 110.

Figure 1B:
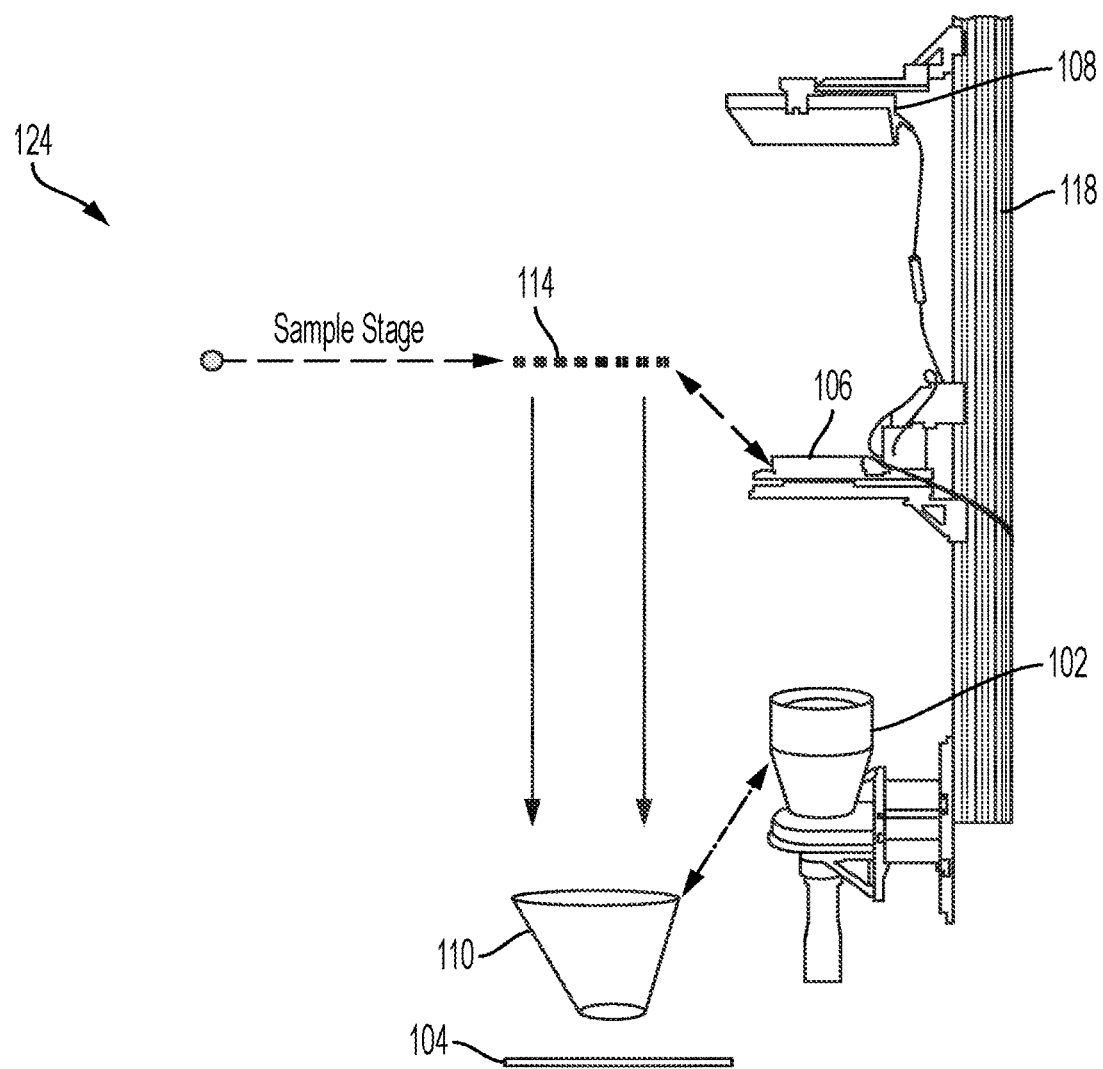

FIG. 1B is a schematic diagram of another exemplary mosaic imaging system 124. Imaging system 124 functions similarly to imaging system 100 mentioned earlier, with one difference: lens array 104 is placed after telecentric lens 110. This can result in varying positions for both intermediate imaging plane 112 and imaging plane 116, depending on the placement of the lens array 104. In this setup, the telecentric lens 110 gathers the illumination, which is then received by lens array 104 for magnification. Lens array 104 can be a part of the telecentric imaging system 102 or a separate component entirely.

Figure 2A:
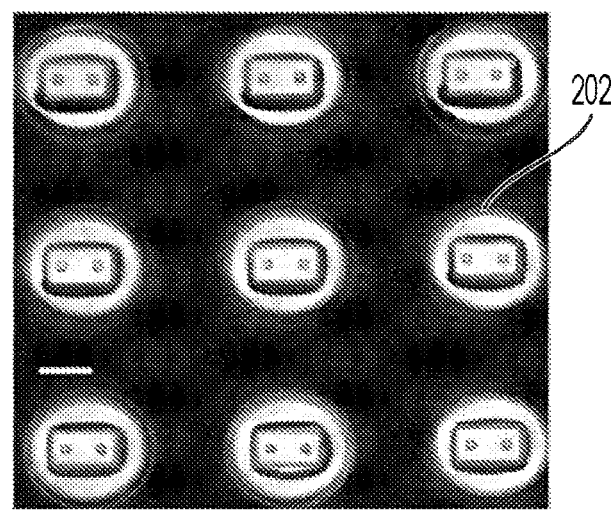
FIGS. 2A-2B are images of µTUGs segmented from a snapshot taken with and without the lens array.
Figure 2B:
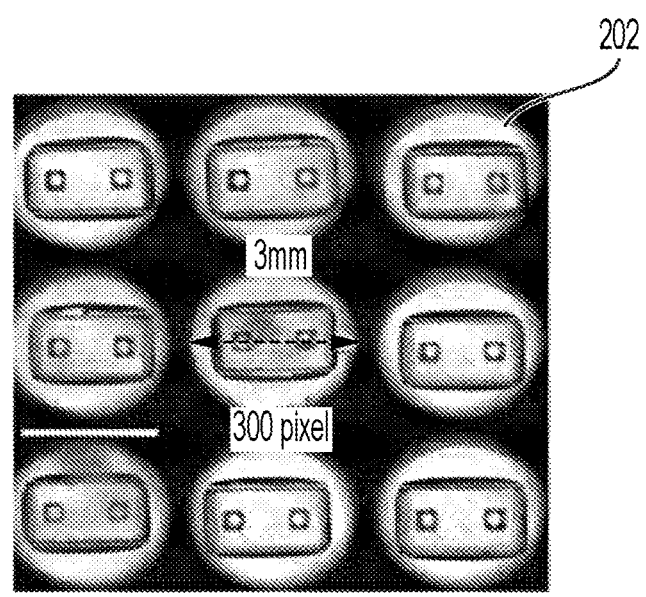

The effect of the lens array 104 is illustrated in FIGS. 2A and 2B by imaging empty µTUGs 202 that have individual ROIs that are 2 mm wide and 1 mm tall. Without lens array (FIG. 2A), the mosaic of ROI only occupied <50% pixels in the resultant image, while the lens array increased the effective use of the FOV by magnifying individual ROI by 3×, as shown in FIG. 2B. In this case, the individual ROI is 300 pixels or 3 mm.

Figure 3A:
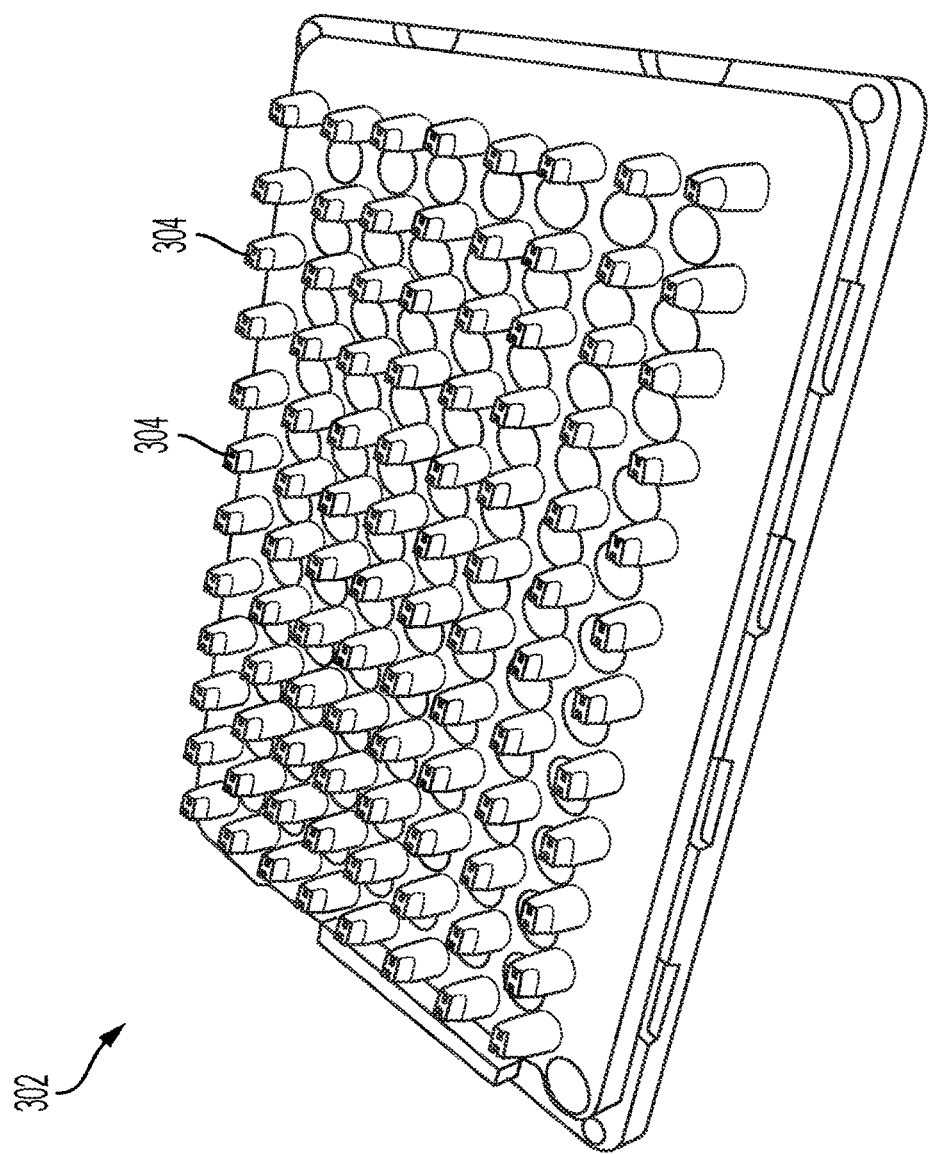
FIGS. 3A-3D are schematic diagrams illustrating a parallel process to mold µTUGs in a standard wellplate.
Figure 3C:
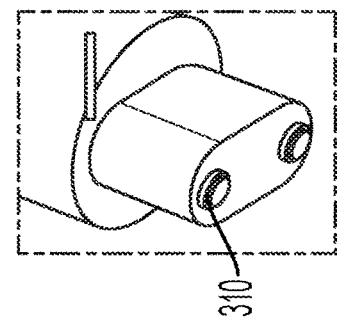
Figure 3D:
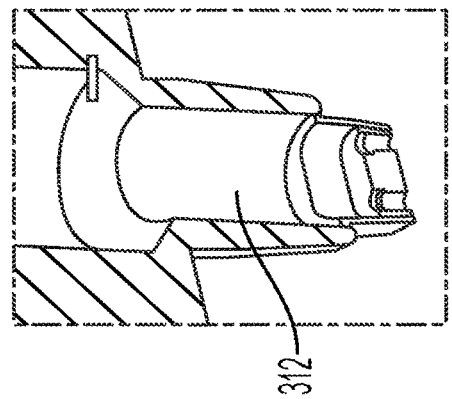
Figure 3B:
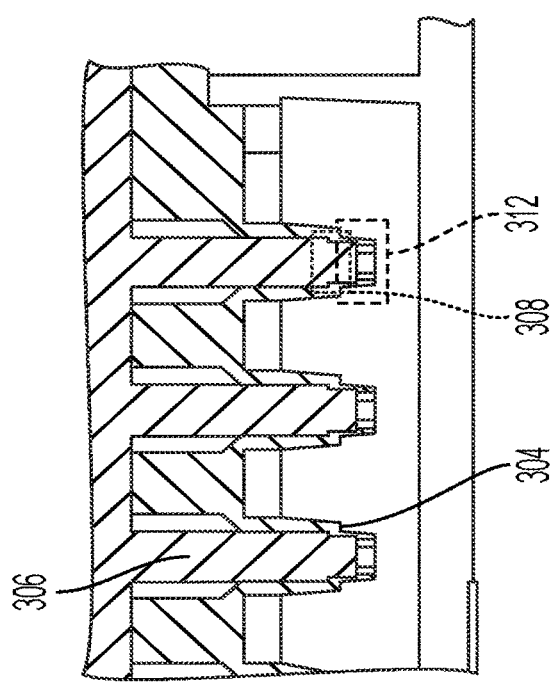

Based on the serial casting and molding process for µTUGs used in previous practice, our optimization focused on reducing the repetitive pick-and-place of the individual stamping molds. A 2-piece aluminum mold well-plate 302 with an array of 96 stamping molds 304 was designed, as shown in FIG. 3A. FIG. 3B shows a cross-sectional view of the mold well-plate 302 assembly during the molding process. Each stamp mold 304 contained the inverse structure of a single µTug 306, as shown in FIG. 3B. The comb 308 created a pair of notches 310 on the cap of the micropillars to aid mold release and to introduce high-contrast target feature for imaging, as shown in FIG. 3C. The comb could slide in and out of the sleeve 312 smoothly. During molding, set screws were tightened to ensure proper alignment of the comb and sleeve. Instead of releasing individual molds 96 times, this parallel mold allowed releasing to be done in a 2-step operation: lifting of the comb and the sleeve, as shown in FIG. 3D.

A single well-plate with the same dimension as the 96 well-plate was prepared as substrate. 58 g of 10:1 (base to curing agent) PDMS mixture was poured into the substrate. After cleaning and drying, the aluminum mold was assembled with the PDMS containing well-plate, step edge of the mold was fitted with the inner edge of the substrate plate. Vacuum degassing was performed between each step. The assembly was placed in level at room temperature (~20-25° C.) for 40-48 hrs. to cure. After curing, the comb is released by turning the set screws against the sleeve. Then, the sleeve is released by turning the set screws against the well-plate corner. Two arrays of set screws that turn against the sleeve and the well-plate corner provided controlled lifting of the comb and the sleeve during demolding. The notches on the top of the µTUGs aided the deformation of the caps so that they could be squeezed out of the mold easier. As a result, this procedure does not require releasing agents. Once finished, a conventional microscope (20×, BX51, Olympus) was used to inspect the manufacturing quality by checking the structural integrity of the µTUGs.

During the spontaneous contraction of the ECTs, the deflection of the micropillars is due to a combination of bending, shear, and distortion of the pillar's attachment to the scaffold base. Even though the pillars are not rigidly fixed because of the compliant PDMS foundation, the lateral stiffness of the pillars can be assumed to be constant as the material is linearly elastic. The relation between the contractile force exerted on one of the pillars ($F_1$) and the deflection of this pillar ($\delta$) can be represented below, where (k) is the lateral stiffness of the pillar:

$$F_1 = k\delta \quad (3)$$

The overall lateral deformation of the ECT is the sum of the lateral deflections of both pillars. Assuming the pillars are geometrically symmetric, the lateral deflection on each pillar is equal. With the experimentally measured micropillar stiffness ($k_{exp}$), the contractile force of the ECT ($F_{ECT}$) can be calculated from the imaged lateral micropillar deflection ($\delta$):

$$F_{ECT} = k_{exp}\delta \quad (4)$$

To experimentally measure the stiffness of the molded micropillars, a nanoindenter was employed using a conospherical probe with a radius of 50 µm. Height of the contact point was defined by the anchor point of the ECT on the pillar. Measurement was conducted using displacement-control mode with μTUGs placed on a glass slide. Indentation cycle included loading (5 μm/s for 100 μm) and unloading (~5 μm/s for ~100 μm) intervals. An endoscope camera recorded the process to capture initial indenter-μTUG contact, indentation location, and indentation process. Stiffness was calculated as the slope of the initial unloading section in the load-displacement curves using a linear least squares fit. Eight to ten tests were conducted for μTUGs with varying shapes, pre-seeding curing time, post-seeding curing time, and post-treatment methods. Two-sided significant testing was applied to calculate differences among the measured lateral stiffnesses of those μTUGs.

To prepare the 96 well-plate for seeding, the wells were subject to functionalization steps to ensure that the tops of the PDMS micropillars were selectively adhesive for the final self-assembled tissue. First, the 96 well-plate with the μTUGs was treated with air plasma for 30 s at 100. Each well was then treated with 0.01% poly-l-lysine for 2 h (diluted in DI water from 0.1% poly-L-lysine) so that the tops of the micropillars and the inner well are fully covered. Subsequently, after aspiration and rinsing with PBS, 1% glutaraldehyde was added to each inner well covering the tops of the micropillars and stored at room temperature for 10 min. The wells were rinsed 3 times and then covered with DI water and left overnight at 4° C. On the day of cell seeding, the wells were sterilized under UV for 15 min. Finally, to ensure the cells and tissue do not adhere to the bottom of the inner well, the bottom surfaces were treated with 2% Pluronic F-127.

After treatment of the wells, compacted tissues were formed around the PDMS micropillars in each well through self-assembly as described previously, from an initial cell-laden gel filling the rectangular inner well containing 54,000 iPSC-derived cardiomyocytes and 6,000 stromal cells (human mesenchymal stem cells, hMSCs). The iPSC-derived cardiomyocytes (iPSC-CMs) used were differentiated from the PGP1 line following a protocol based on the temporal regulation of the Wnt signaling pathway and purified by lactate starvation for 4 days (in glucose-free RPMI supplemented with 4 mM sodium lactate). Upon completion of the differentiation protocol, these iPSC-CMs were replated on fibronectin-coated dishes and cultured for over 2 weeks in RPMI with B-27 supplement). A total of 60,000 cells was added to each well, suspended in 6 μL of extracellular matrix comprising of Fibrin (final concentration of 4 mg/mL using human fibrinogen and 0.4 U/mg Thrombin) and 10% Matrigel mixed in base media (RPMI with Gibco B-27 supplement, Aprotinin and ROCK inhibitor Y-27632).

To prevent the clotting of fibrinogen prior to seeding into the 96 wells, first, 2 μL of base media containing the total amount of thrombin was added to each well and spread uniformly across the bottom of the inner well. Then, 4 μL of the solution containing the 60,000 cells and required ECM (Matrigel and Fibrinogen) were added to the inner well and mixed once with the pipette. Every two adjacent columns were sealed with parafilm strips to limit evaporation and the plates were inverted immediately following the addition of cells to allow the cells to settle near the tops of the PDMS micropillars as the Fibrin clots. Immediately after the clotting of Fibrin (~5 min), the plates were flipped back and 100 μL of growth media (DMEM with 10% fetal bovine serum, 1% Nonessential amino acids, 1% GlutaMAX and 1% penicillin-streptomycin) was added to each well.

The growth media used after seeding was supplemented with 5 μM Y-27632 and 33 μg/mL of aprotinin. Y-27632 was removed after 1 day of culture, and the concentration of aprotinin was halved after a week. The 96 well-plates were stored in a tissue culture incubator at 37° C. with 5% $CO_2$ and the media was replaced every 48 h. Over a period of 2-5 days, the microtissue detaches from the edges of the inner well and compacts around the tops of the two PDMS pillars.

A block-matching program may be implemented to obtain micropillar deflection by recording the time series of the selected ROI within the specified measurement period. Before tracking started, the centers of the correlation window were manually selected on a snapshot (reference frame for the correlation) of the entire well-plate. Typically, features with high contrast such as the notches on the cap of the μTUGs were selected to maximize imaging quality. 96 correlation windows were generated with width and height set for the configured optical setting (overall magnification of the optics). MATLAB then continuously tracks the target feature in each correlation window. Parallel computing must be enabled to allow larger processing bandwidth than video acquisition. Length of each measurement video was controlled at 2000 frames (~30 s). Deflection of the micropillar was obtained by averaging the peaks on the selected segments of the displacement-time plot. To convert the imaged deflection in pixels to microns, an optical ruler with precise line gratings of known lengths was imaged.

Typically, the average peak contractile force for this geometry of μTug was about ~100 μN and the average lateral micropillar stiffness was measured to be ~5 μN/μm. Here, the imaging resolution limit was about 10 μm, micropillar localization precision was 1 μm, and lateral stiffness of μTUG micropillars was averaged 5.3 μN/μm. The resultant nominal sensitivity of contractile amplitude for the described parallel high throughput imaging system is ~0.2 μN.

Figure 4B:
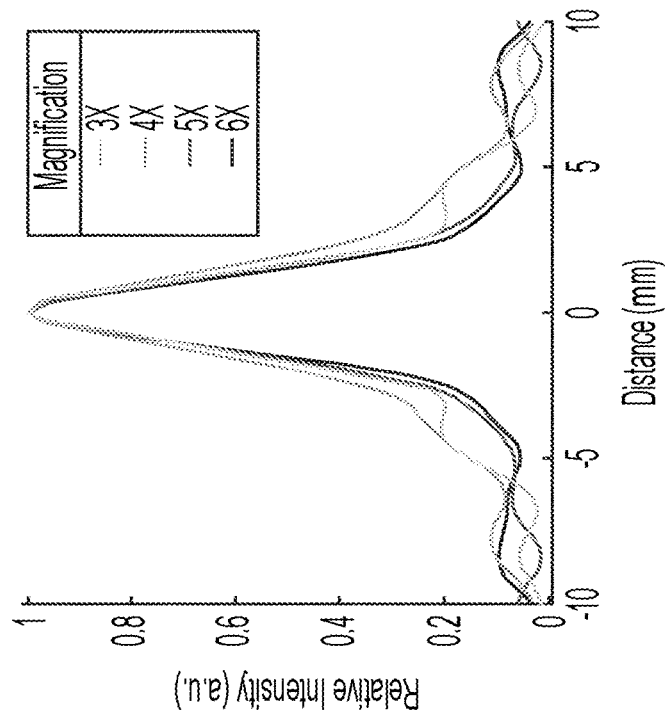
FIGS. 4A-4G are images and graphical results validating the optical resolution of the mosaic imaging system.
Figure 4A:
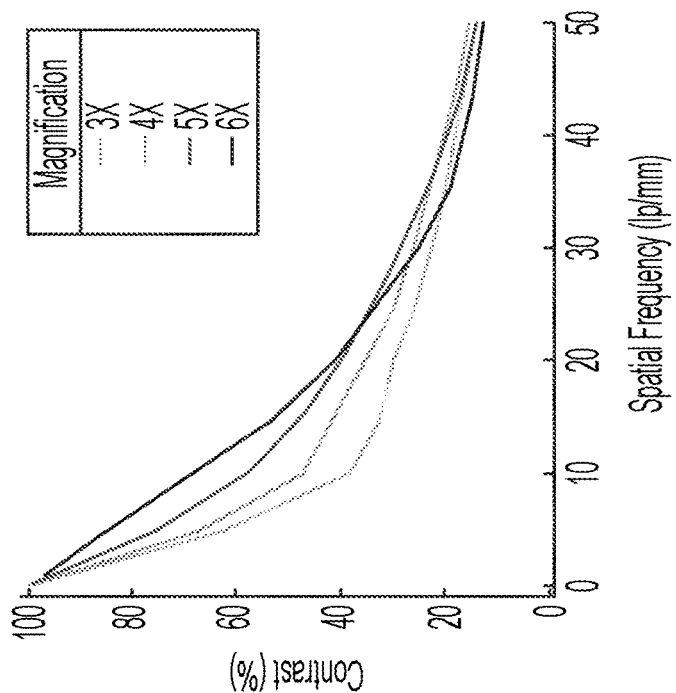

The nominal numerical aperture (NA) of the optical system can be adjusted by changing the magnification of the lens array subsystem. In optical simulations performed on Zemax simulation, it is determined, at 20% cutoff contrast, the modulation transfer function (MTF) reached the highest spatial frequency at 4× and 5× lens array magnification, as shown in FIG. 4A. The point spread function (PSF) indicated that 4× had the widest first order Airy ring, followed by 5× and 6×, as shown in FIG. 4B. Both analytic results implied the best optical configuration of our designed setup should use lens array between 4× and 5×.

Figure 4E:
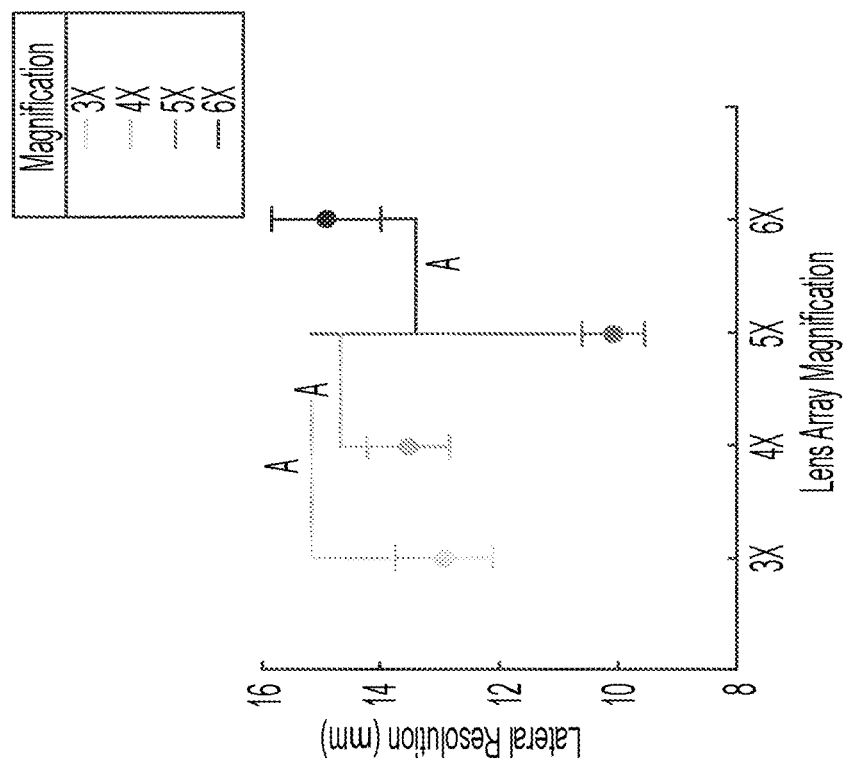
Figure 4D:
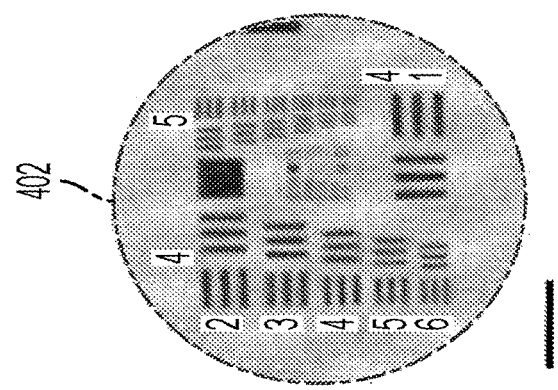
Figure 4C:
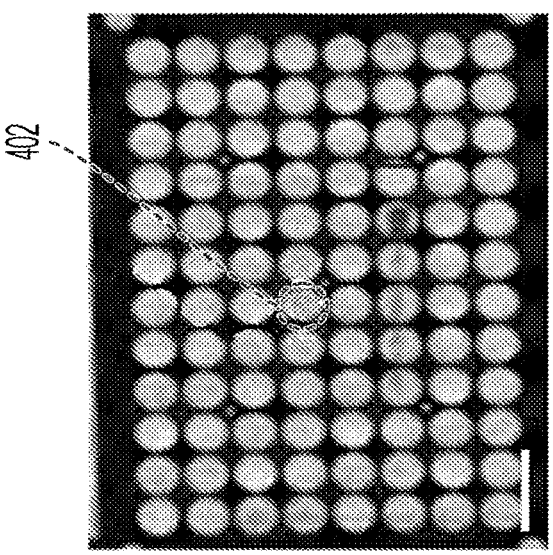

The lateral image plane resolution was then experimentally tested by imaging a positive USAF 1951 high resolution target. As shown in FIG. 4C, the air force target 402 was placed at the center of a sub-aperture. From each quadrant of the lens array, 4 sub-apertures were tested. FIG. 4D shows the lateral resolution was obtained by justifying the least resolvable element on the air force target 402. The same procedure was repeated for all four magnifications simulated before. Result validated that ×5 lens array magnification had a best lateral resolution of 10.08±0.54 μm, agreed with the analytic values of ~45 l p/mm and ~10 μm in the MTF and PSF respectively, as shown in FIG. 4E. Paired t-tests were conducted between the ×5 group and all other magnification groups, $p<0.001$ was denoted with A for comparison between 5× and 3×, 5× and 4×, and 5× and 6×.

Figure 4G:
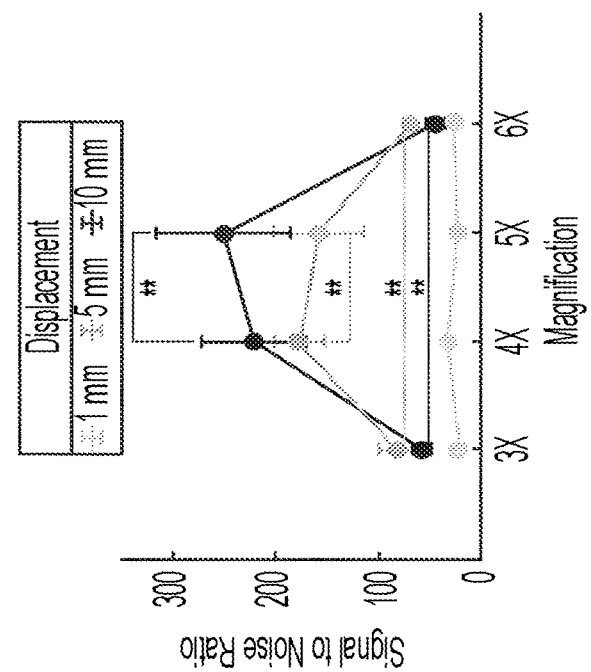
Figure 4F:
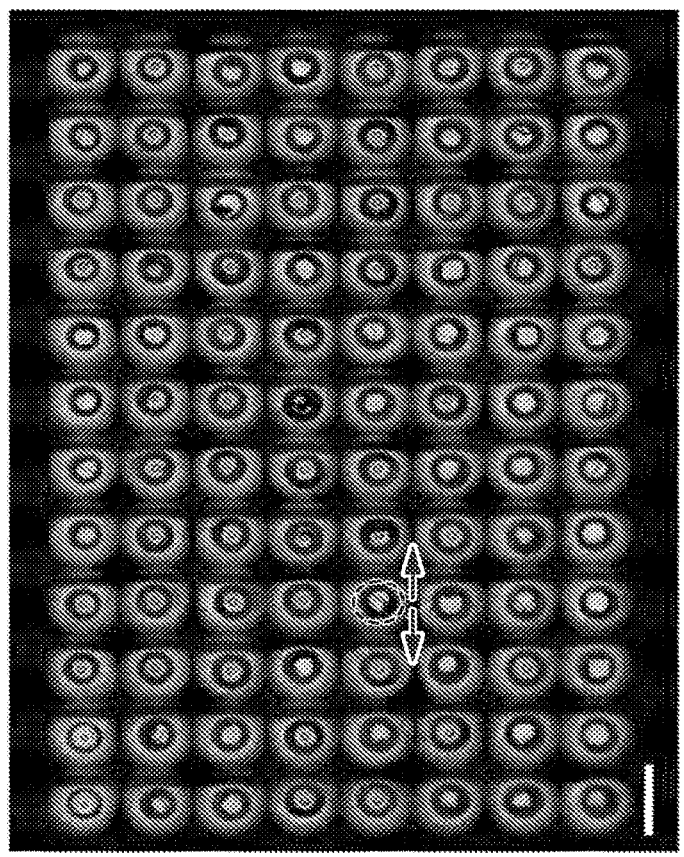

A second imaging experiment was performed using a μTUG-seeded well-plate without ECTs. The well-plate was fixed on 2-axis motorized sample stage. With a precision controller, the μTUGs were translated laterally in a sinusoidal pattern at 0.5 Hz to mimic the effect on micropillars of ECT beating, as shown as FIG. 4F. Three levels of displacement, 1 μm, 5 μm, and 10 μm, were tested. A total of 10 translation experiments were recorded for each level of displacement. Using the previously described tracking program, time series of the µTUG displacement was plotted. From these plots, the signal-to-noise ratio (SNR) of the measured displacement was collected, as shown in FIG. 4G. The best SNR recorded was above 200:1. Data points were grouped by the tested displacements. For each data point, the specific displacement was travelled 10 times. Error bars represent standard deviation. Within each displacement group, paired t-tests were conducted between every magnification pair, $p > 0.05$ was denoted with B for tests on 4× and 5×, 3× and 6× in both the 5 µm and 10 µm displacement groups. $p > 0.05$ was found for all magnification pairs in the 1 µm displacement group but was not denoted for the clarity of FIG. 4G.

With the validated optics, to satisfy the chronic tracking required by current cardiotoxicity screening protocols, repetitive contractile characterization of the ECTs over a prolonged period (17 days) were conducted. A well-plate was molded with 96 µTUGs, the µTUG stiffness was tested from the used batch: measured µTUG stiffness was 5.30±0.97 µN/µm (for a total of 20 samples). Then, the µTUGs were seeded with 3D ECTs. After compaction of ECTs, the well-plate was transferred into the stage top incubator of the imaging system. Starting on day 1, contractile force was measured every 48 h for an interval of 2000 frames (~30 s). Peaks of the contractile force were averaged within each interval, as show in FIG. 5A. Culturing media was changed every 48 h from day 2. The well-plate was kept in the stage top incubator the entire duration of this test except for media change. Illumination was used only for the measurement period to avoid phototoxicity. The contractile force and the contractile frequency of all 96 ECTs were collected in FIGS. 5B-5D.

Figure 5B:
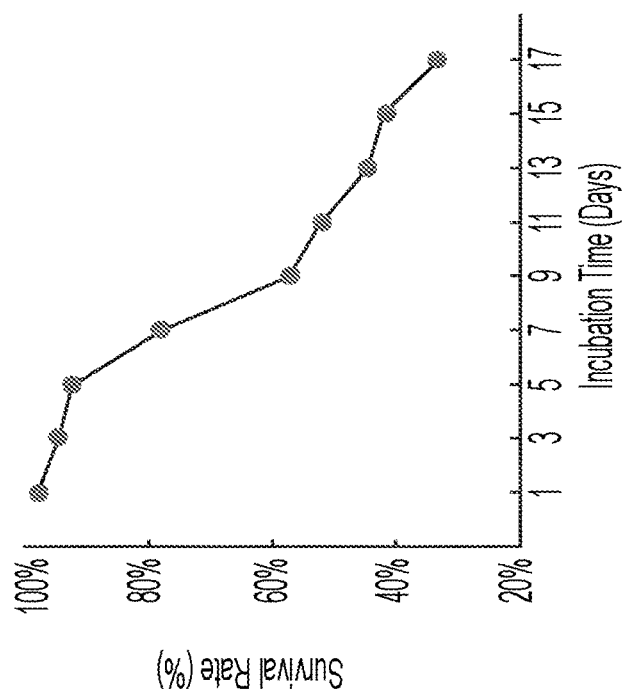
FIGS. 5A-5D are graphical results of chronic tracking of contractile forces for ECTs seeded on a wellplate.
Figure 5A:
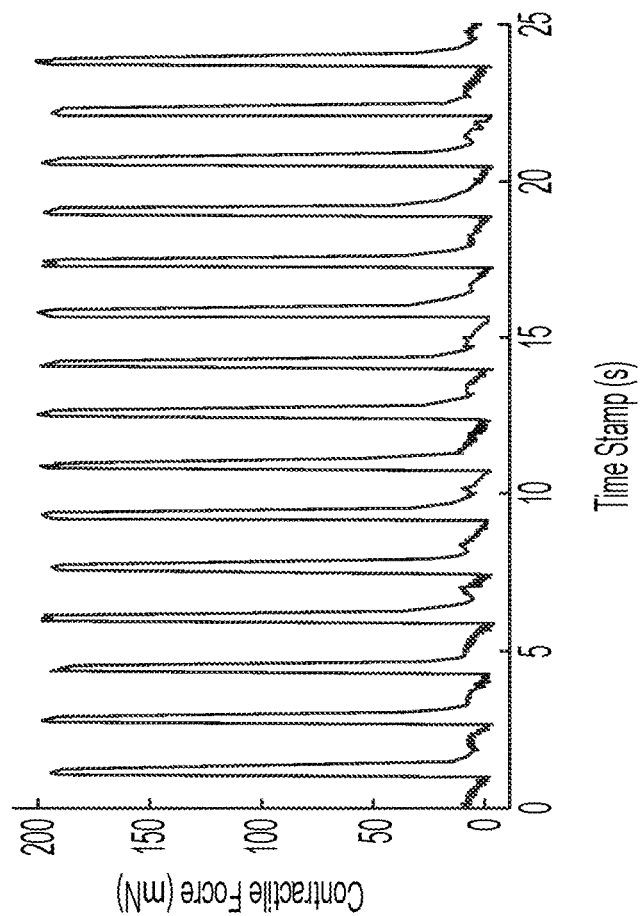
Figure 5C:
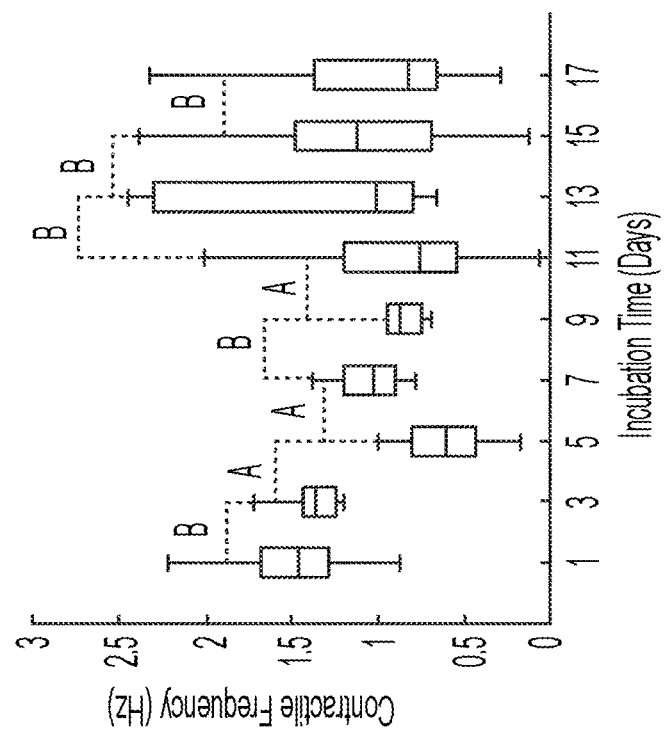
Figure 5D:
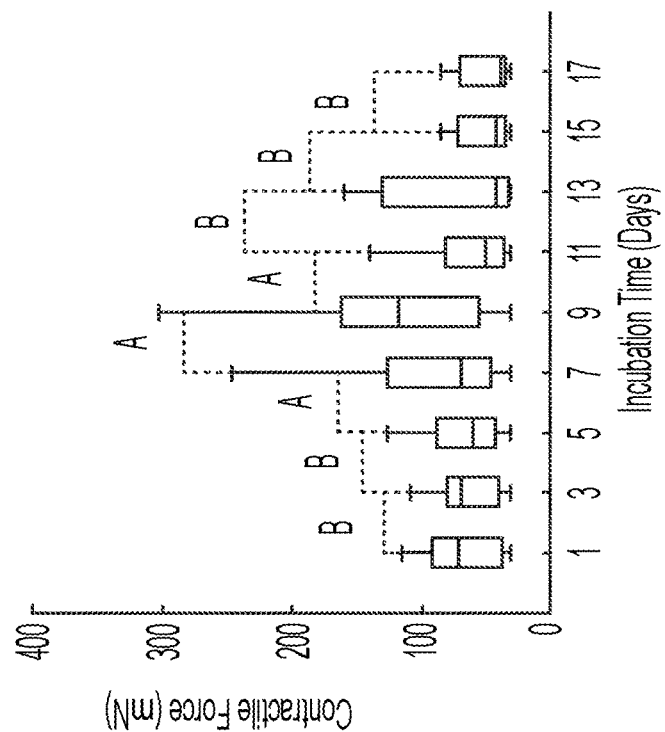

In particular, FIG. 5B shows the tissue survival rate of 96 ECTs over the 17-day monitoring period. FIG. 5C shows the collective contractile force of all living ECTs on the 96-well-plate over the 17-day monitoring period. FIG. 5D shows the collective contractile frequency of all living ECTs on the 96 well-plate over the 17-day monitoring period. For FIGS. 5C and 5D, vertical bars represent the extremes of each data group, horizontal bars within each box represent the medians of each data group. Whisker lines represent the minimum and maximum values for measurement of contractile amplitude and frequency for ECTs with an active spontaneous contraction on the respective dates. A balanced ANOVA test was performed between consecutive measurement days for both measurements of contractile amplitude and contractile frequency, $p \geq 0.01$ between consecutive measurements was denoted as A, $p < 0.01$ between consecutive measurements was denoted as B.

A second ECT-seeded well-plate was administrated with drugs of known effects, positive inotrope isoproterenol was chosen for this experiment. Isoproterenol was diluted with the culturing media into two concentration groups with a control group (i.e., 0 µM, 0.1 µM, and 1 µM). Every 4 consecutive columns of the well-plate were designated for each concentration group. The isoproterenol media was distributed into a standard V-bottom 96 well-plate and maintained at 37° C. before adding to the ECTs. Started on day 1, ECT was nourished with normal media every 48 h. On day 4 and day 6, before adding the compound, the sample plate was imaged for a reference contractile force measurement. A 96-well liquid handler with environmental control block was used to dose the compound-media mix into the ECT seeded well-plate while maintaining the culture environment. The well-plate was transferred to the imaging system immediately. Acquisition was triggered every 5 min for 30 min. Finally, the ECTs were washed with PBS solution and loaded with drug-free culturing media. Day 4 and day 6 data are combined and presented in FIGS. 6A-6D.

Figure 6A:
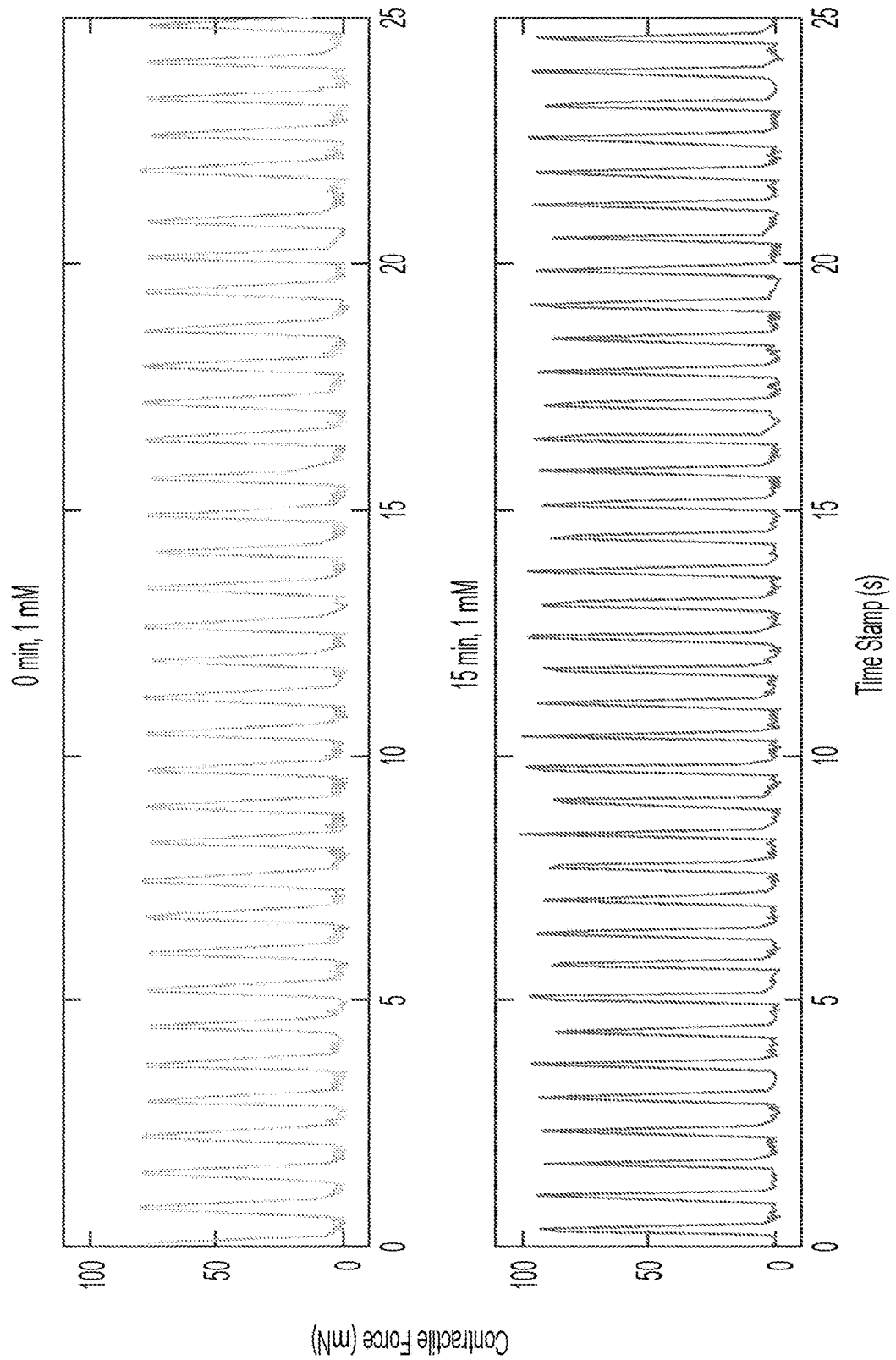
FIG. 6A-6C are graphical results of monitoring contractile behavior changes induced by different concentration of isoproterenol.

In particular, FIG. 6A shows the sample force-time plots for ECT in well #14 on day 4 at 0 min and 15 min after culturing with 1 µM isoproterenol. FIG. 6B shows the tracking of the relative contractile force for 30 min after dosing with isoproterenol. Error bars represent standard deviations for the ECT groups dosed with respective concentrations. Unbalanced ANOVA tests were performed for concentration group 0.1 µM and 1 µM with respect to the control group. For concentration of 0.1 µM, $p < 0.01$, denoted as A, for incubation time of 5, 10, 20, and 25 min. For concentration of 1 µM, $p < 0.01$, denoted as B, for incubation time of 5, 10, 15, 20, and 25 min. Additional unbalanced ANOVA tests were performed between concentration group of 0.1 µM and 1 µM, $p < 0.01$ for incubation time of 15, 20, and 25 min.

Figure 6C:
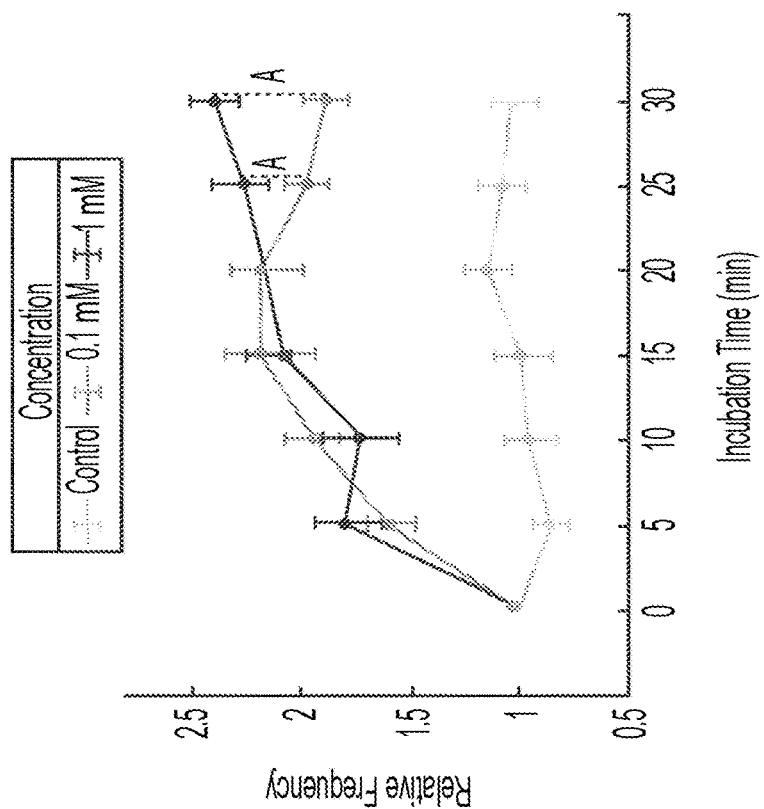
Figure 6B:
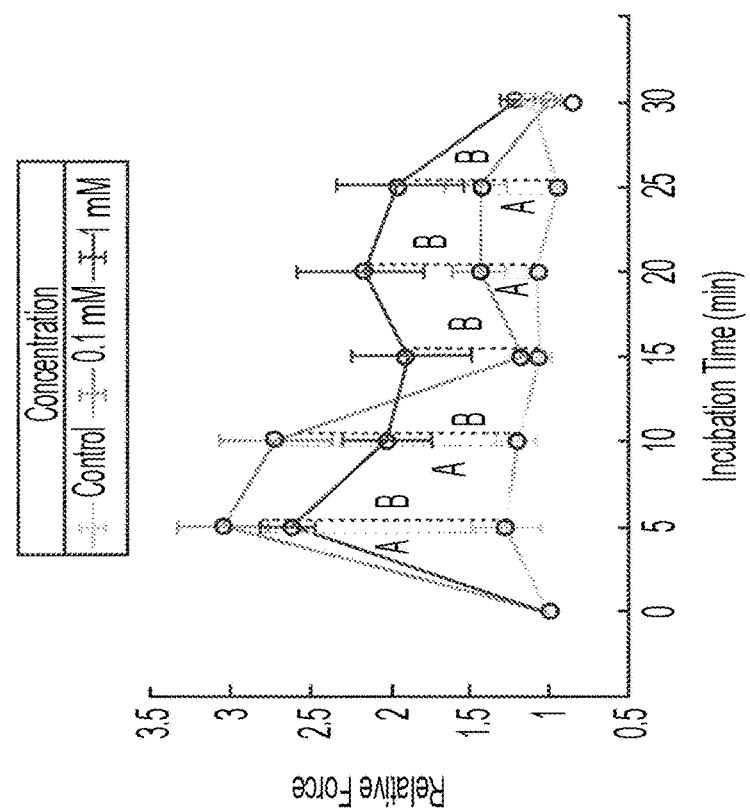

FIG. 6C shows the tracking of the relative contractile frequency for 30 min after dosing with isoproterenol. Error bars represent standard deviations for the ECT groups dosed with respective concentrations. Unbalanced ANOVA tests were performed for concentration group 0.1 µM and 1 µM with respect to the control group. For both concentration groups, $p < 0.01$, no denotation was used in the figure for the ease of viewing, for incubation time of 5, 10, 15, 20, 25, and 30 min. Additional unbalanced ANOVA tests were performed between concentration group of 0.1 µM and 1 µM, $p < 0.01$, denoted as A, for incubation time of 25 and 30 min.

Figure 7B:
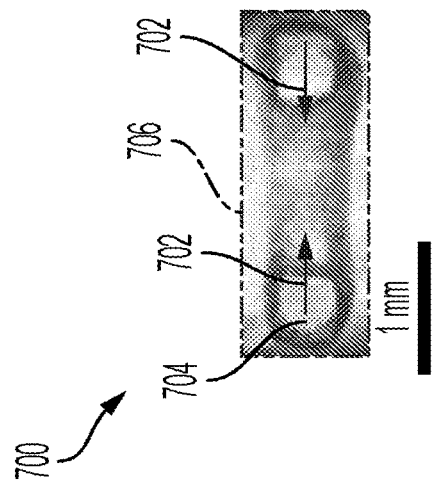
FIGS. 7A-7G are images and graphical results for mechanical modeling the µTUGs and characterization of the fabricated µTUGs.
Figure 7A:
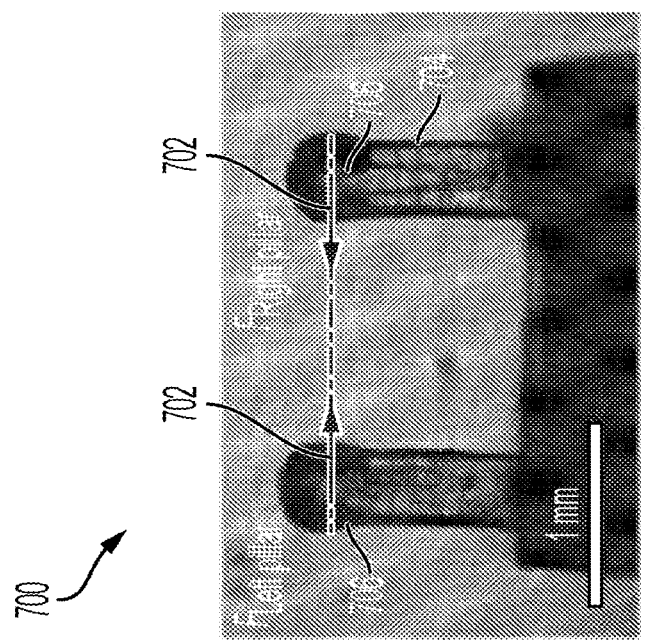
Figure 7D:
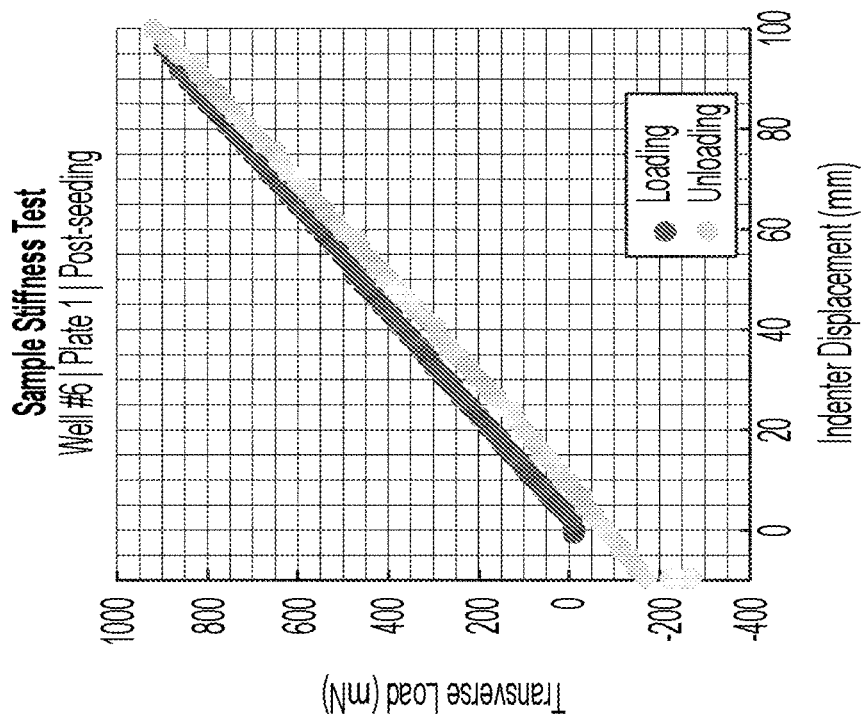
Figure 7C:
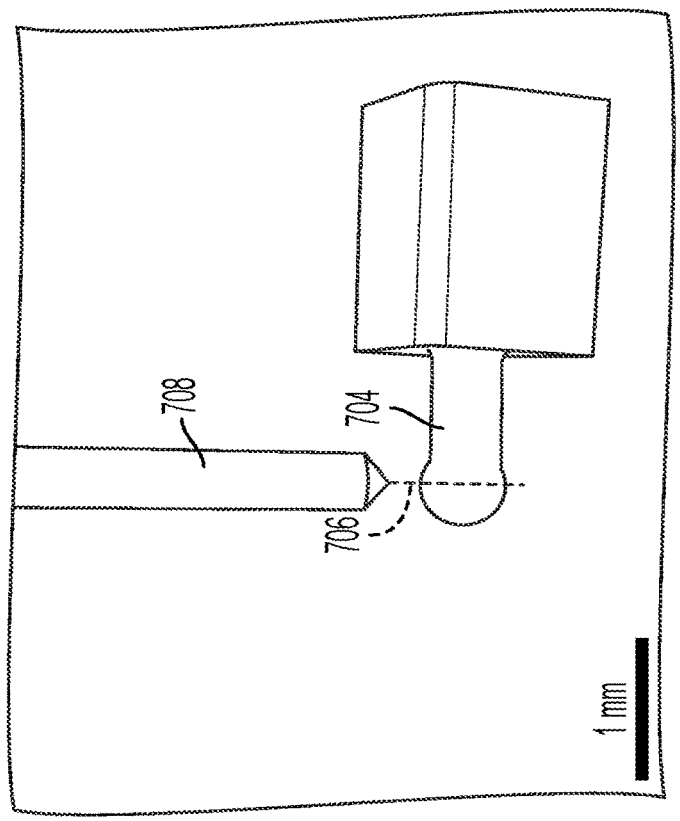
Figure 7F:
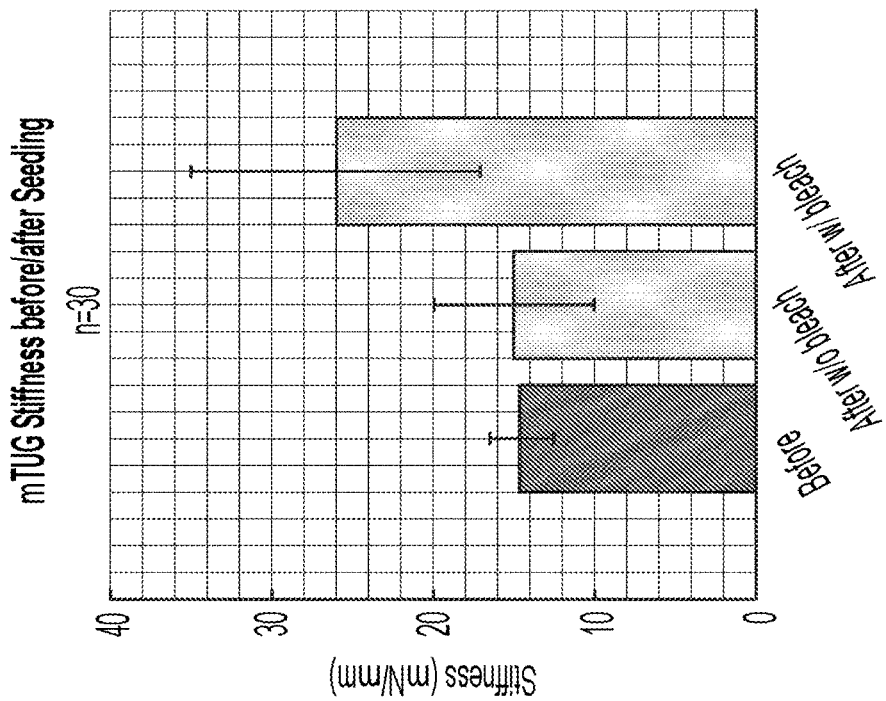
Figure 7E:
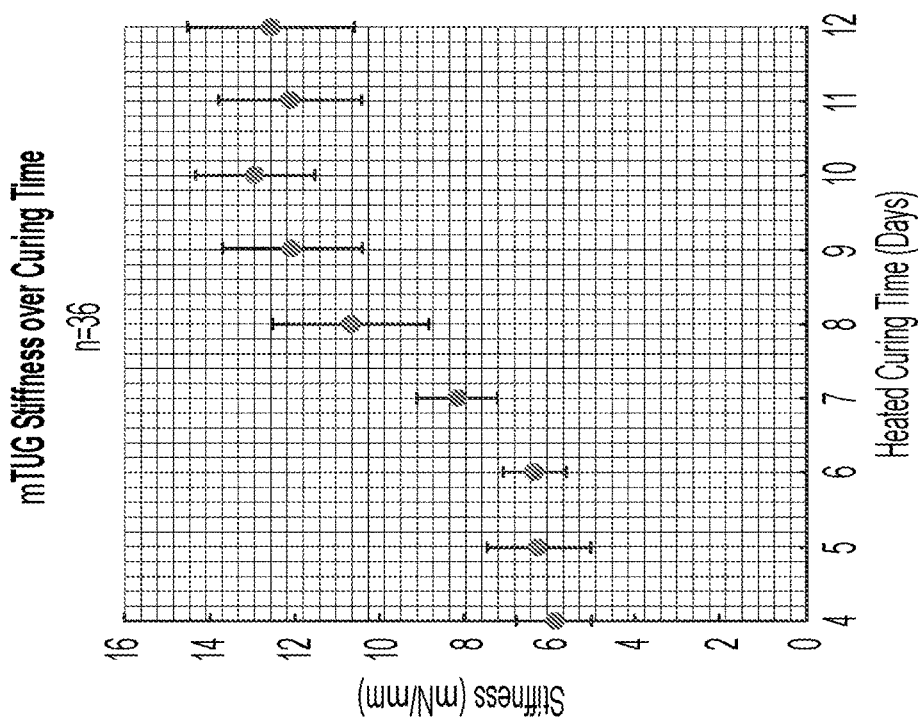

FIGS. 7A-7G show the mechanical modeling of µTUGs and characterization of the fabricated µTUGs. FIG. 7A shows a side view of an empty µTUG 700 with arrows 702 indicating the sum contractile forces exerted on the micropillars 704, the dashed lines 706 indicate the vertical location of the contractile forces, image acquired using a customized side-view microscope for quality check of fabricated µTUG. FIG. 7B shows a top view of a tissue-loaded µTUG 700 to indicate the lateral position of the representative contractile forces with respect to the vertical position indicated in FIG. 7A. FIG. 7C is an endoscopic picture of the nanoindenter 708 during a stiffness test, indentation site is located at the position of the sum contractile force as indicated before. FIG. 7D is a load-displacement plot for the indenter during the stiffness test performed on a sample µTUG after tissue seeding. FIG. 7E shows the µTUG stiffness over an extended period of heated curing for a group of 36 untreated, unseeded µTUGs. FIG. 7F shows the µTUG stiffness before and after tissue seeding, the ECT bonded to the µTUG was removed with bleach or low concentration 70% ethanol.

Figure 7G:
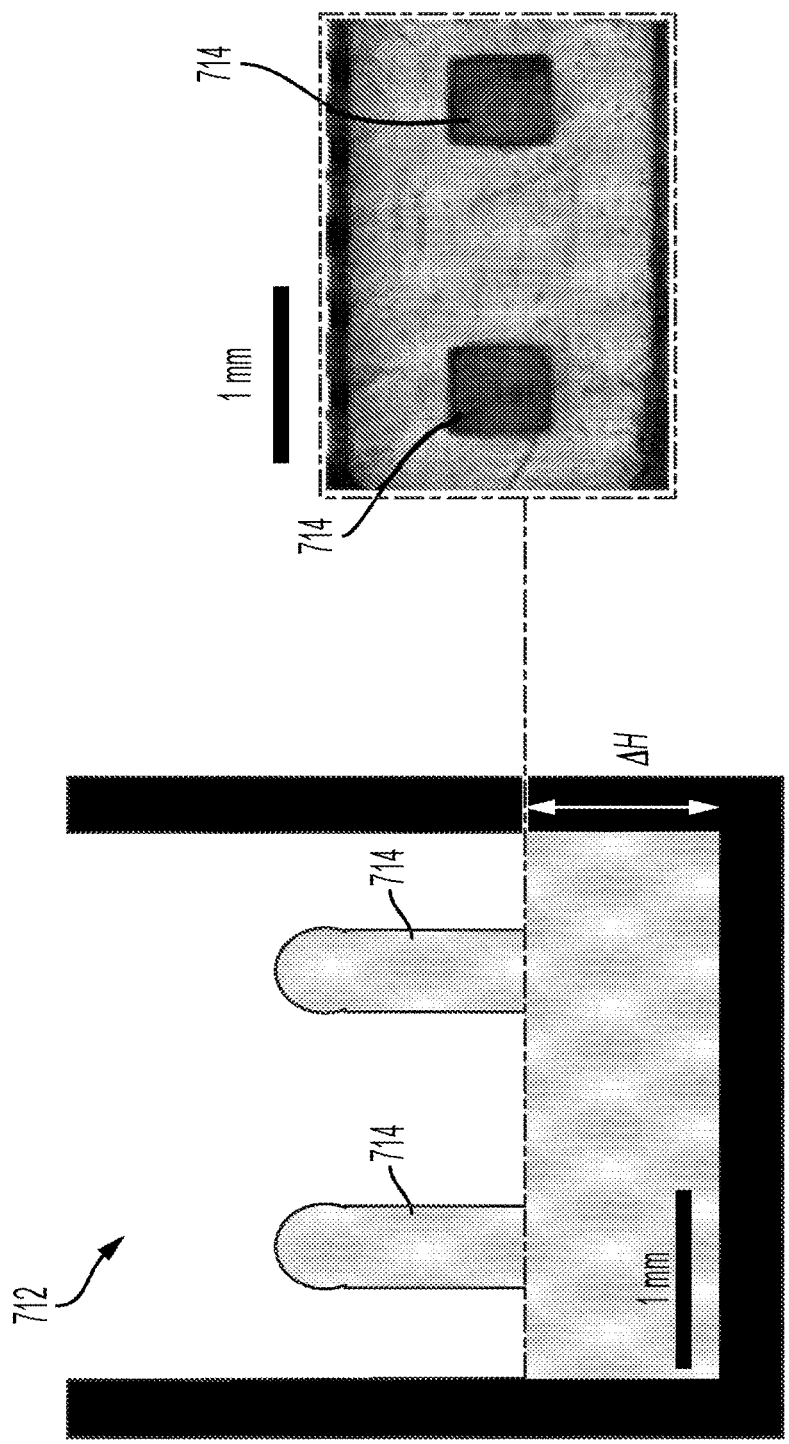

FIG. 7G shows a sample stage 712 was first adjusted to focus on the glass bottom of the well on the well-plate, with a motorized micro-controller, the position of the sample stage 712 was recorded as ΔH while the focus plane moved up to the base of the micropillars 714. Since the structural compliance of all µTUGs were examined, the height of the micropillar base may equivalent to the height of the cap section. Variations in the micropillar height with respect to the well-plate for a total of 24 selected µTUGs was 46.28±13.96 µm, less than 5% of the measured DOF (0.97±0.07 mm). The lateral variation was qualitatively checked with the mosaic imaging system; across all well-plates prepared for ECT seeding, both micropillars of all µTUGs were well contained within each sub-aperture. All optically restrained engineering requirements were satisfied.

Figure 8A:
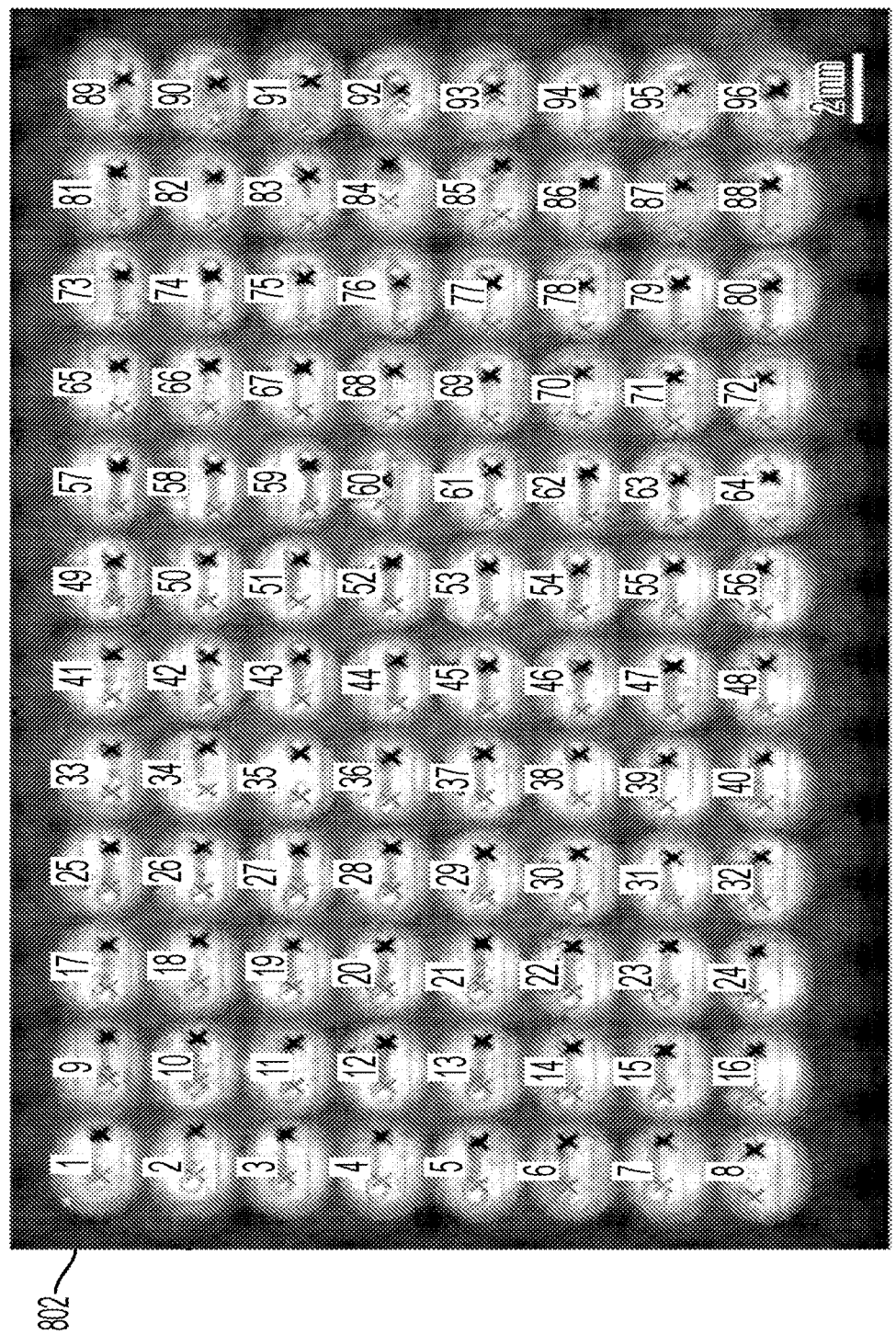
FIGS. 8A-8D are images and graphical results illustrating an exemplary automated micropillar detection program.
Figure 8C:
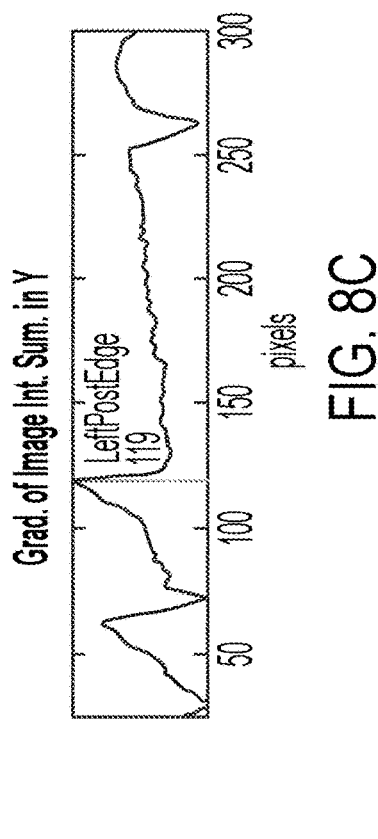
Figure 8B:
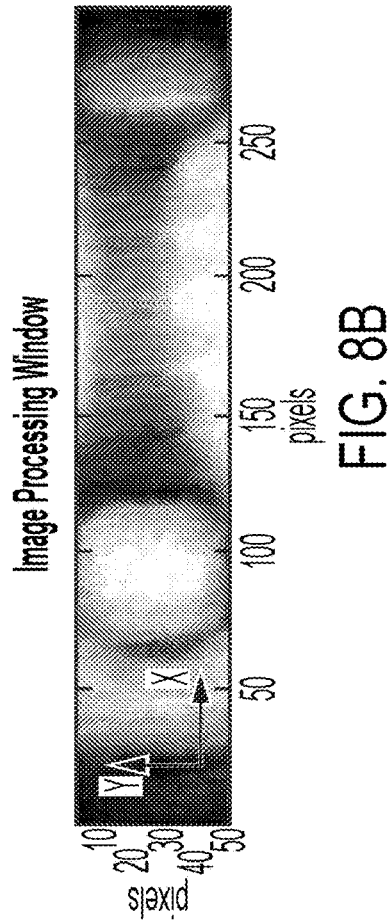
Figure 8D:
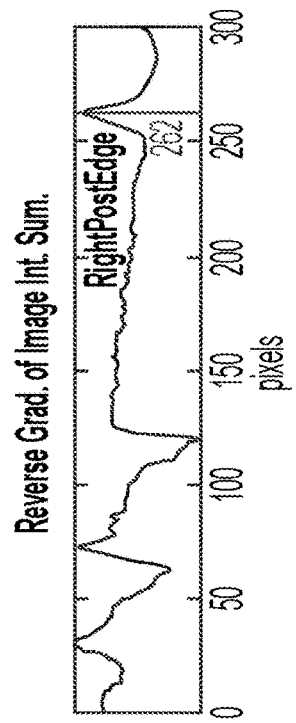

FIGS. 8A-8D are schematic diagrams illustrating an exemplary automated micropillar detection program. FIG. 8A is a map of the detected inner edges on a sample ECT seeded 96 well-plate 802. FIG. 8B shows the image processing window covering only the height of the micropillars and the gradient plot of the sum of the intensity in the x direction. To find the right edge, local maximum of the left half on the gradient plot is identified, as shown in FIG. 8C. To find the left edge, local maximum of the inverse of the right half on the inversed gradient plot is identified, as shown in FIG. 8D.

Once imaged with sufficient resolution, the automated micropillar detection program retrieves information from video acquired to cover several contractions using a block-matching, cross-correlation program. The sizing of the cross-correlating blocks would be crucial to achieve the required processing speed with reliable robustness. It should allow user-tuning of such image processing window to achieve the best results based on the dimension of the µTUGs as well as the magnification settings of the imaging setup.

The location of the center for the image processing window should be placed at the inner edges of the micropillars. This automated detection should also not take up too much processing bandwidth and be readily parallelized. It was justified that the gradient of the 1D summation of the image intensity along the long axis (x direction) of a pre-processing imaging strip spanning on the height of the micropillar (y direction) can provide sufficient contrast for locating of the inner edges, as shown in FIG. 8B.

This method was adapted from frequently used manual selection of the inner edge for most single-plex video microscopy contractile force measurement method. According to a preliminary test, quality of the automatic edge detection is relatively reliable for ECTs pronounced normally on a 96 well-plate using the proposed imaging setup, as shown in FIG. 8A. However, failure occurs on ECTs that did not compact or ripped off from the µTUG. Since contractile force calculation would be trivial on the failed ECTs, a filter that rejects abnormal samples from the edge detection program could also save subsequent processing time in contractile force calculation. Lastly, a user-friendly GUI interface may be used to allow real-time display of the contractile force during the imaging procedure.

Figure 9:
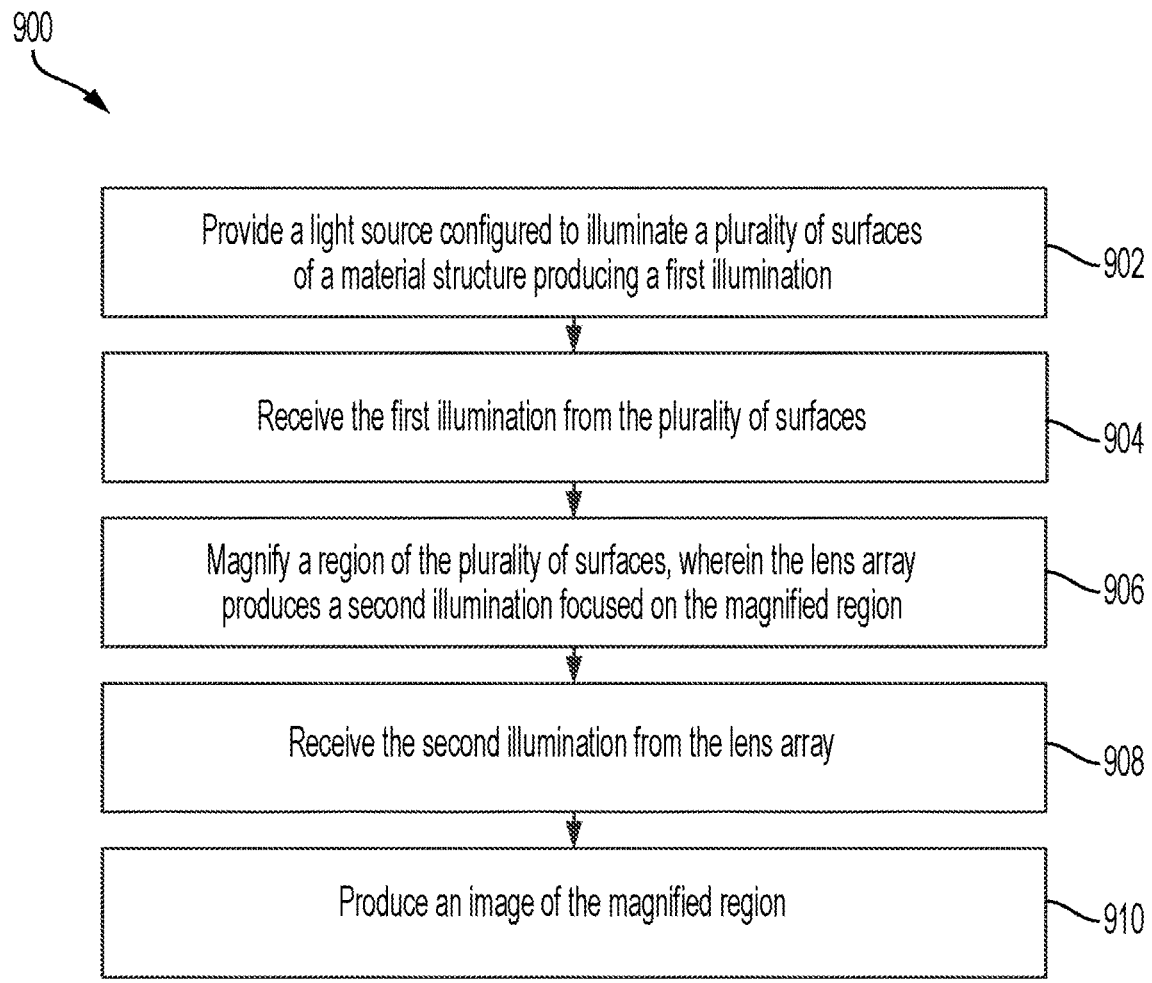
FIG. 9 is a process flowgraph of operations included in an exemplary process 900 for imaging an object.

FIG. 9 is a process flowgraph of operations included in an exemplary process 900 for imaging an object. Process 900 includes providing a light source configured (such as illumination source 108) to illuminate a plurality of spatially separated regions (such as µtug of well-plate 106) of a material structure (such as ECTs) producing a first illumination (Step 902). Process 900 includes providing a lens (such as telecentric lens 110) for producing an image (such images of FIG. 2A and FIG. 2B) of the spatially separated regions (Step 904). Process 900 includes magnifying, using a lens array (such as lens array 104), the spatially separated regions of the image (Step 906). The lens array produces a mosaic image comprised of magnified subimages (such as FIG. 2B) of each region spatially separated region (Step 908). Process 900 includes providing a camera sensor (such as CMOS sensor of telecentric imaging system 102) to record the image (Step 910).

In some implementations, the light source may include a white light emitting diode panel. The light source may include a laser or LED illumination intended to excite fluorescence in the spatially separated subregions, and an optical filter is positioned in front of the camera to reject excitation light but pass fluorescently emitted light from the subregions. The material structure may include engineered cardio tissue. The material structure may include biological samples. Each lens of the lens array may be concentrically aligned with each of the plurality of surfaces. Each of the lens may include a doublet lens. The lens is a telecentric lens. Process 900 may include positioning the lens array before the lens. Process 900 may include positioning the lens after the lens.

A label-free, wide-field imaging system is presented that measures contractile activities for 3D ECTs seeded on a 96 well-plate. In addition to satisfying the imaging requirement, the manufacturing of PDMS µTUG scaffolds to the 96-well format has been successfully scaled up. An automated image acquisition, processing and data illustration pipeline was scripted. Each module ran at >60 Hz, enabling video rate contractile force monitoring. Compared to other current video microscopy imaging techniques for 3D ECTs, the imaging system, described herein, is the first of its kind to show capability of true 96-well tissue seeding and parallel contractile force sensing, strongly aligning with the technical need and market pull for high throughput toxicity screening with 3D ECTs.

Functionality of our system was validated by two experiments: continuous culturing and monitoring of 96 ECTs over 17 days; and contractile responses to isoproterenol. The experimental settings were compliant with current low throughput cardiotoxicity assay. The contractile force and frequency responses matched with reported interaction between ECTs and isoproterenol. The experiments with multiple compound concentrations distributed across well-plates were conceived as one way to demonstrate the utility of multiplexing on the platform. There are no logistical barriers to extending that multiplexing to administering different compounds at different concentrations. Additional characterization of these tissues after contractility measurements was not done. However, ECTs of this type and in these scaffolds have been characterized previously.

Given the functional imaging resolution limit of 10 µm, localization precision of 1 µm, and a stiffness of µTUG scaffold of 5.3 µN/µm, the resultant nominal sensitivity of contractile amplitude for the described parallel high throughput imaging system is 0.2 µN, and the system can measure contractile forces with relatively high SNR (~200:1).

The temporal resolution of the system is limited primarily by the frame rate of imaging, nominally 60 Hz. Current regulatory guidelines are based on screening drug-induced action potential prolongation of 5-10 ms, which is smaller than the 33 ms Nyquist-limited temporal resolution achievable using a 60 Hz frame rate. To reach the frame rates relevant for that task, the camera frame rate could be increased further by binning 2×2 or 4×4 pixels. The current system is oversampled by almost a factor of three by the camera, which features 3.45 µm pixels in an optical system with ~10 µm resolution. One could achieve a frame rate of 133 Hz (15 ms temporal resolution) with no loss of image quality if one used 2×2 pixel binning, and a frame rate of 200 Hz (10 ms temporal resolution) with modest reduction in lateral resolution if one used 4×4 pixel binning. Prior studies of action potential dynamics following drug introduction in tissue monolayers used imaging frame rates of 200 Hz in an individual ECT assay. In calcium imaging, dozens of drug-induced proarrhythmic risks were assessed using a standardized protocol at three test sites, with imaging frame rates of 62.5 Hz. As this is comparable to the frame rate in the experiments reported here, it is believed that the frame rate used is already compatible with requirements for calcium imaging.

The imaging system may be designed to accommodate fluorescence imaging with minor modifications, namely, installing a commercially available 96 well-plate transillumination source, and adding an emission filter to the camera sensor. It would be speculative to predict performance of such a system, though one can estimate whether these two modifications could enable fluorescence membrane potential sensing using our optical system. The illumination source cited would produce a maximum photon flux I at the sample of $9.3 \times 10^{21}$ photons/(m² s). For a common membrane sensor the surface density S of fluorophores is of order $10^{17}$ molecules/m², the absorption cross section Ga is $9.6 \times 10^{-21}$ m²/molecule, and the quantum yield F is 0.057. The fluorescence output is the product $IS\sigma_a F$, or $5.1 \times 10^{17}$ photons/(m² s). The total tissue cross sectional area for the 96 ECTs in a well-plate is about $1.0 \times 10^{-4}$ m² meaning that $5.1 \times 10^{13}$ photons/s of emitted fluorescence F emanates from the well-plate.

The numerical aperture of the detection system is 0.056, which leads to a light collection efficiency η of $7.8 \times 10^{-4}$ at the camera sensor. The camera spectral response $R_s$ is 0.85 and its quantum efficiency $Q_e$ is 0.62. So, total fluorescence reaching the camera sensor is $R_s Q_e \eta F$, or $2.1 \times 10^{10}$ photons/sec. The magnified ECT surface in the mosaic image represents about 20% of the camera sensor's pixels. If the fluorescence were distributed evenly across those $2.4 \times 10^6$ pixels, the fluorescence on each pixel would be 8,800 photons/(pixel s), several orders of magnitude larger than the sensor's detection threshold of 4.6 photons/(pixel s). This analysis ignores photobleaching and other effects that might impact imaging performance. Nevertheless, it suggests that membrane potential imaging might be possible with only minor changes to the system.

The other functionality needed for electrophysiological characterization is the means to electrically stimulate the tissues. Prototype of a 96-well electrode array and a high power electrical controller have been built. Upon future validation, the imaging system can allow imaging of both the contractile and electrophysiological responses of the ECT within one single system.

Moreover, any functional assay of engineered tissues—not limited to ECTs—with similar optical requirements in terms of resolution, FOV and speed can be performed with the imaging system. A few candidates may include neuron excitation imaging and endothelial cells and fibroblasts dynamics in wound closure, or the like.

A high-throughput screening system for contractile force evaluation is provided. Preliminary drug tests have shown the potential of this system to fit the FDA's framework of cardiotoxicity screening with 3D ECTs. With the future inclusion of multiple modes of functional characterization for ECTs, and expansion to other engineered tissue types, this platform has the potential for translation and widespread use in the high-throughput characterization of engineered tissues.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. An imaging system comprising:
   a light source configured to illuminate directly a plurality of spatially separated regions to generate a first illumination, each of the spatially separated regions including a material surface;
   a lens array that includes one or more achromatic doublet lenses for magnifying the spatially separated regions, the lens array directly receiving the first illumination from the illuminating of the spatially separated regions, wherein the lens array generates a second illumination that magnifies the spatially separated regions, and wherein each lens of the lens array is concentrically aligned with a center of each of the spatially separated regions; and
   a telecentric lens for directly receiving the second illumination from the lens array, wherein the telecentric lens directs the second illumination to a camera sensor to generate a mosaic image of the magnified spatially separated regions, and wherein the camera sensor records the mosaic image.

2. The imaging system of claim 1, wherein the light source comprises a white light emitting diode panel.

3. The imaging system of claim 1, wherein the light source comprises a laser or LED illumination intended to excite fluorescence in the spatially separated regions, and an optical filter is positioned in front of the camera sensor to reject excitation light but pass fluorescently emitted light from the spatially separated regions.

4. The imaging system of claim 1, wherein the material surface is a surface of an engineered cardio tissue.

5. The imaging system of claim 1, wherein the material surface is a surface of a biological sample.

6. The imaging system of claim 1, wherein an optical rail is configured to adjust a position of the telecentric lens.

7. The imaging system of claim 1, wherein the lens array is disposed between the spatially separated regions and the telecentric lens.

8. The imaging system of claim 1, wherein the telecentric lens includes at least one of a bi-telecentric lens.

9. The imaging system of claim 1, wherein modification of an axial placement of the lens array allows variance in magnification of the mosaic image.

10. The imaging system of claim 9, wherein a variance in magnification of the mosaic images ranges from 3× to 6×.

11. A method for imaging an object, the method comprising:
    providing a light source configured to illuminate directly a plurality of spatially separated regions to generate a first illumination, each of the spatially separated regions including a material surface;

magnifying, using a lens array that includes one or more achromatic doublet lenses, the spatially separated regions, the lens array directly receiving the first illumination from the illuminating of the spatially separated regions, wherein the lens array generates a second illumination that magnifies the spatially separated regions, and wherein each lens of the lens array is concentrically aligned with a center of each of the spatially separated regions;

providing a telecentric lens for directly receiving the second illumination from the lens array, wherein the telecentric lens directs the second illumination to a camera sensor to generate a mosaic image of the magnified spatially separated regions; and recording, using the camera sensor, the mosaic image of the magnified spatially separated regions.

12. The method of claim 11, wherein the light source comprises a white light emitting diode panel.

13. The method of claim 11, wherein the light source comprises a laser or LED illumination intended to excite fluorescence in the spatially separated regions, and an optical filter is positioned in front of the camera sensor to reject excitation light but pass fluorescently emitted light from the spatially separated regions.

14. The method of claim 11, wherein the material surface is a surface of an engineered cardio tissue.

15. The method of claim 11, wherein the material surface is a surface of a biological sample.

16. The method of claim 11, wherein an optical rail is configured to adjust a position of the telecentric lens.

17. The method of claim 11, wherein the lens array is disposed between the spatially separated regions and the telecentric lens.

18. The method of claim 11, wherein the telecentric lens includes at least one of a bi-telecentric lens.

19. The imaging system of claim 11, wherein modification of an axial placement of the lens array allows a variance in magnification of the mosaic image.

20. The imaging system of claim 19, wherein the variance in magnification of the mosaic images ranges from 3× to 6×.

21. An imaging system comprising:
a light source configured to illuminate directly a plurality of spatially separated regions to generate a first illumination, each of the spatially separated regions including a material surface;
a lens array that includes one or more achromatic doublet lenses for magnifying the spatially separated regions, the lens array directly receiving the first illumination from the illuminating of the spatially separated regions, wherein the lens array generates a second illumination that magnifies the spatially separated regions; and
a telecentric lens for directly receiving the second illumination from the lens array, wherein the telecentric lens directs the second illumination to a camera sensor to generate a mosaic image of the magnified spatially separated regions, and wherein each lens of the lens array is concentrically aligned with a center of each of the spatially separated regions, and wherein the camera sensor records the mosaic image, and the mosaic image is used to identify a property of the spatially separated regions.

* * * * *